US008204287B2

(12) United States Patent
Inoue et al.

(10) Patent No.: US 8,204,287 B2
(45) Date of Patent: Jun. 19, 2012

(54) IMAGE PROCESSING APPARATUS, IMAGE PROCESSING METHOD AND IMAGE PROCESSING PROGRAM

(75) Inventors: Ryoko Inoue, Hachioji (JP); Tetsuo Nonami, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 12/859,628

(22) Filed: Aug. 19, 2010

(65) Prior Publication Data
US 2010/0316273 A1    Dec. 16, 2010

Related U.S. Application Data

(62) Division of application No. 11/630,934, filed as application No. PCT/JP2006/305024 on Mar. 24, 2006, now Pat. No. 7,907,775.

(30) Foreign Application Priority Data

Apr. 27, 2005   (JP) ................................. 2005-130229
Apr. 27, 2005   (JP) ................................. 2005-130231

(51) Int. Cl.
*G06K 9/00*   (2006.01)

(52) U.S. Cl. ........ 382/128; 382/129; 382/130; 382/131; 382/132

(58) Field of Classification Search .......... 382/128–132; 600/476, 562
See application file for complete search history.

(56) References Cited

U.S. PATENT DOCUMENTS

| 6,621,924 B1 | 9/2003 | Ogino et al. |
| 2002/0177779 A1* | 11/2002 | Adler et al. .................... 600/476 |
| 2004/0225223 A1* | 11/2004 | Honda et al. .................. 600/476 |
| 2004/0240716 A1 | 12/2004 | de Josselin de Jong et al. |

FOREIGN PATENT DOCUMENTS

| EP | 1 618 828 A1 | 1/2006 |
| JP | 05-210736 | * 8/1993 |
| JP | 06-060182 | 3/1994 |
| JP | 07-037056 | 2/1995 |
| JP | 2004-337596 | 12/2004 |
| WO | WO 94/03871 | 2/1994 |
| WO | WO 02/073507 A2 | 9/2002 |
| WO | WO 2004/096025 A1 | 11/2004 |

OTHER PUBLICATIONS

Extended European Search Report dated Sep. 13, 2010.
Extended Supplementary Partial European Search Report dated Sep. 13, 2010.

* cited by examiner

*Primary Examiner* — Vu Le
*Assistant Examiner* — Amara Abdi
(74) *Attorney, Agent, or Firm* — Scully, Scott, Murphy & Presser, P.C.

(57) ABSTRACT

A hemorrhage edge candidate area extraction section extracts a candidate area for the outline part of a hemorrhage area, based on an image signal of a medical image constituted by multiple color signals obtained by capturing an image of a living body. A feature quantity calculation section calculates a feature quantity of the hemorrhage area based on calculation of the amount of change in the image signal in a small area including the candidate area, among multiple small areas obtained by dividing the medical image. A hemorrhage edge determination section determines whether or not the candidate areas are the outline part of the hemorrhage area based on the feature quantity.

18 Claims, 25 Drawing Sheets

FIG.7
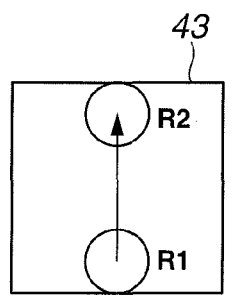
(a)
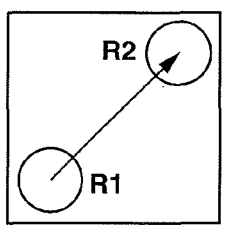
(b)
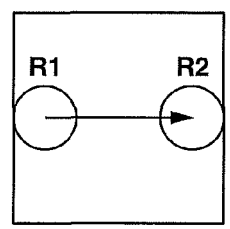
(c)
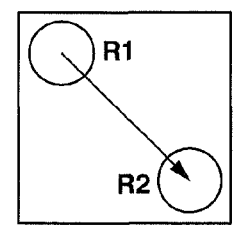
(d)
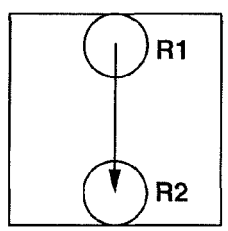
(e)
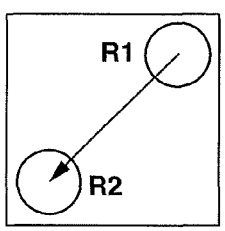
(f)
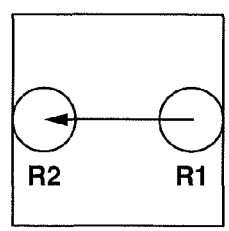
(g)
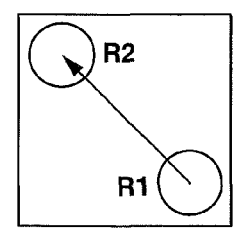
(h)

44 BLEEDING PART EDGE CANDIDATE AREA
72 INTERNAL AREA
42 BLEEDING PART AREA

FIG.20
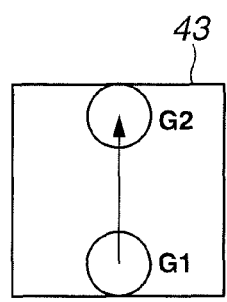
(a)
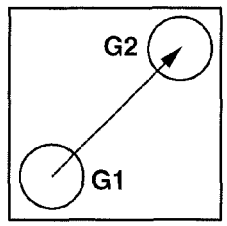
(b)
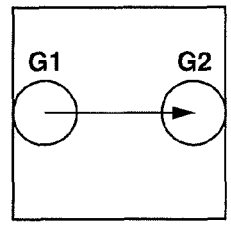
(c)
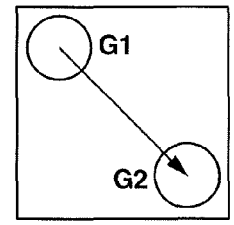
(d)
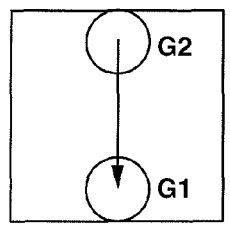
(e)
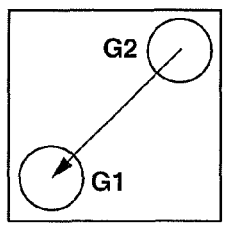
(f)
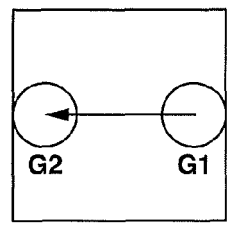
(g)
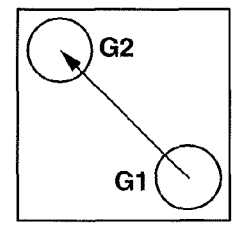
(h)

FIG.22
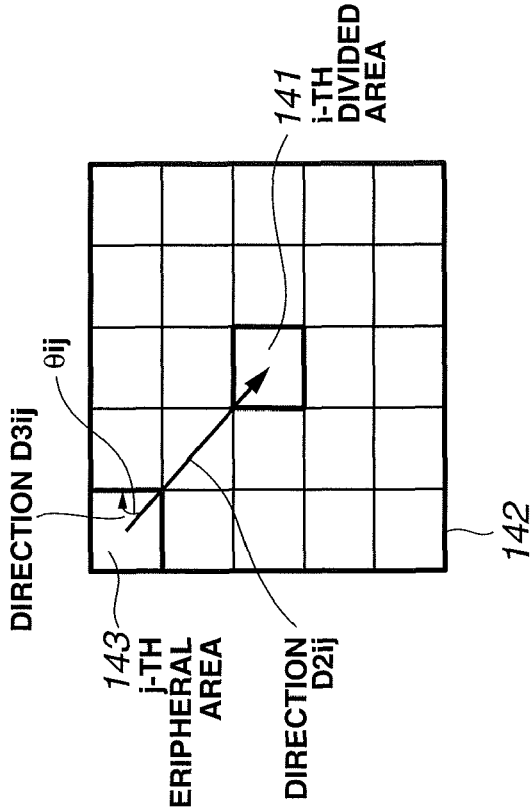
(b)
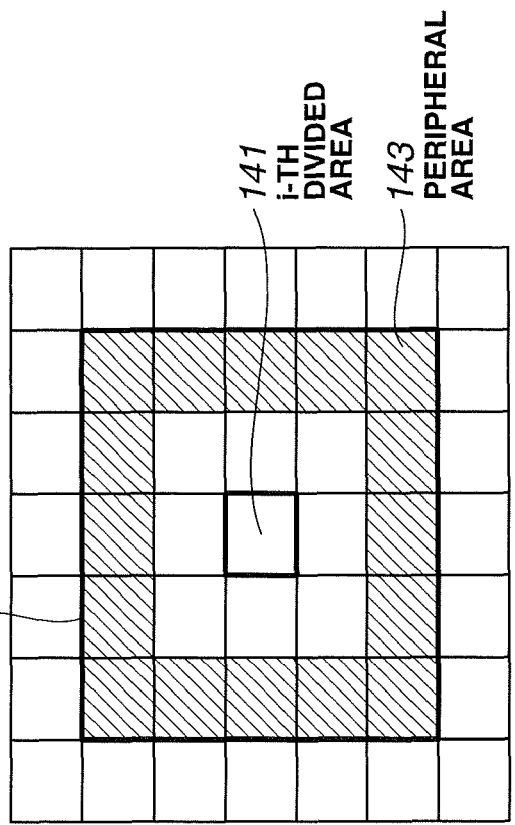
(a)

FIG.25
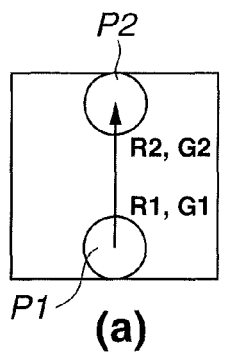 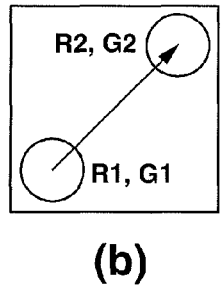 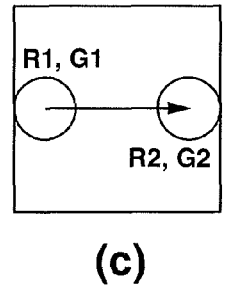 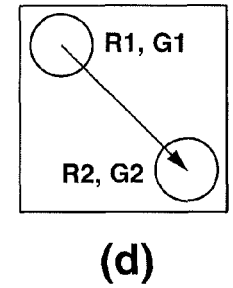
(a) (b) (c) (d)
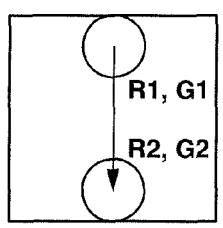 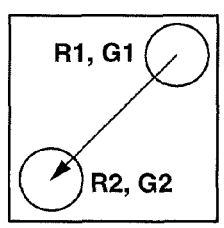 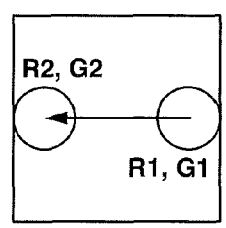 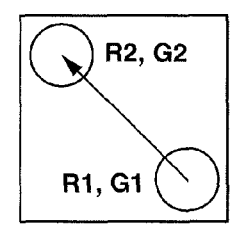
(e) (f) (g) (h)

141 i-TH DIVIDED AREA
143 PERIPHERAL AREA 141 i-TH DIVIDED AREA

FIG.29
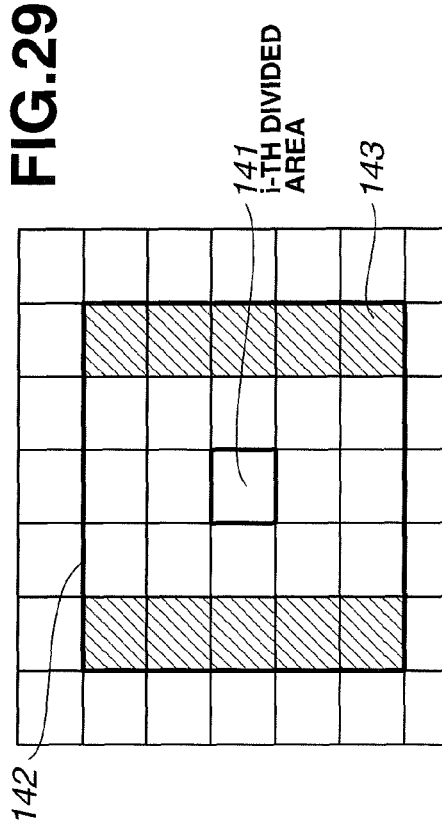
(b)
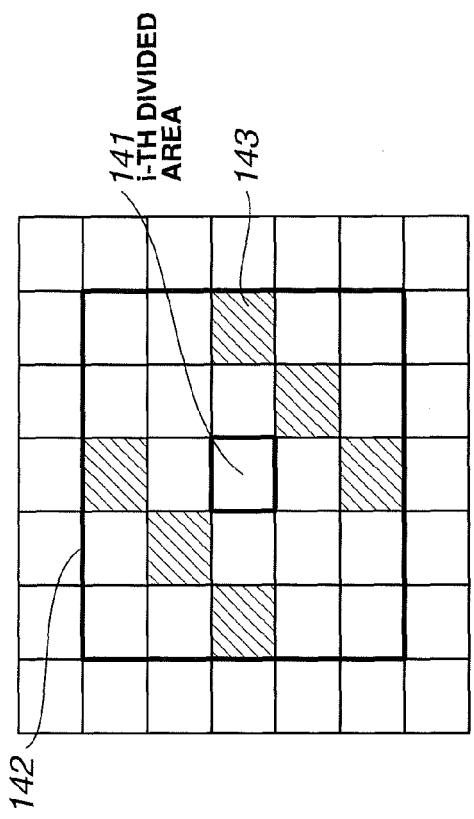
(d)
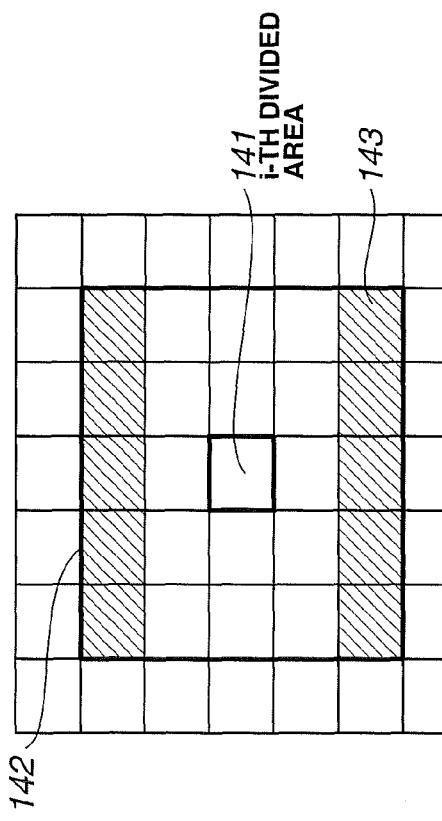
(a)
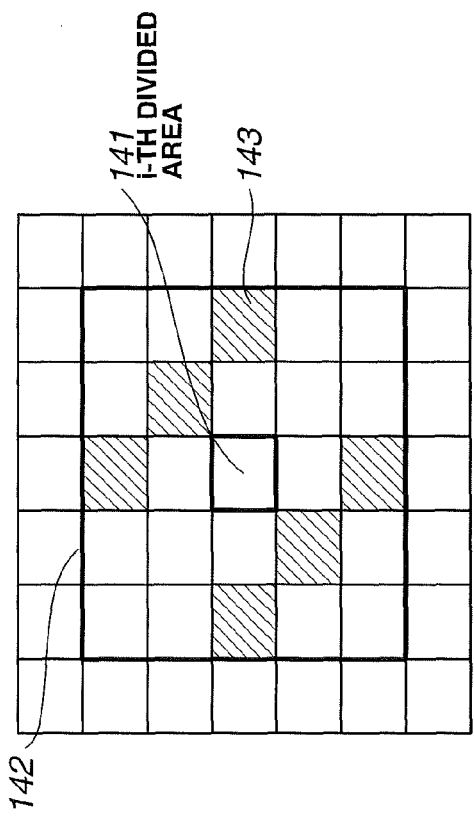
(c)

IMAGE PROCESSING APPARATUS, IMAGE PROCESSING METHOD AND IMAGE PROCESSING PROGRAM

CROSS REFERENCE TO RELATED APPLICATIONS

This application is a Divisional Application of U.S. Ser. No. 11/630,934 filed on Dec. 27, 2006, which is a national stage application under PCT/JP2006/305024 filed on Mar. 14, 2006, which claims the benefit of priority to JP 2005-130229 filed on Apr. 27, 2005 and JP 2005-130231 filed on Apr. 27, 2005, the contents of each of which are incorporated herein by reference.

TECHNICAL FIELD

The present invention relates to an image processing apparatus, an image processing method and an image processing program for extracting a hemorrhage edge based on a medical image obtained by an endoscope apparatus and the like.

BACKGROUND ART

In the medical field, observation and diagnosis of an internal organ in a body cavity with the use of medical equipment having an image-capturing function, such as X-ray, CT and MRI apparatuses, an ultrasonic observation apparatus and an endoscope apparatus, are widely performed.

For example in the case of an endoscope apparatus, a long and thin insertion section is inserted into a body cavity; an image of the internal organ in the body cavity acquired by an objective optical system provided for the tip of the insertion section is captured by image-capturing means such as a solid-state image capturing device; and an endoscope image of the internal organ in the body cavity is displayed on the monitor screen based on the image-capturing signal. An operator performs observation and diagnosis based on the endoscope image displayed on the monitor screen.

Since the endoscope apparatus is capable of directly capturing an image of digestive tract mucous membrane, the operator can observe various findings such as the color tone of mucous membrane, the shape of a lesion shape and a fine structure on the surface of mucous membrane.

Recently, a capsule endoscope apparatus has been developed as medical equipment having a new image-capturing function, the usefulness of which can be expected similarly to the endoscope apparatus. The capsule endoscope apparatus captures images of the inside of a body cavity after a subject to be examined swallows a capsule endoscope until it is discharged to the outside of the body and sends image-capturing signals to a receiver provided outside the body. As many as several hours are required for the capsule endoscope to pass through each of digest tracts of esophagus, stomach, duodenum, small intestine and large intestine inside the body cavity and be discharged to the outside of the body, after the subject to be examined swallows the capsule endoscope.

Assuming that if the capsule endoscope apparatus captures, e.g., 2 (frames of) images per second and sends the images to the receiver outside the body, then it takes 6 hours from the capsule endoscope apparatus being swallowed to being discharged outside of the body, the capsule endoscope apparatus would capture as many as 43200 pieces of images while advancing in through the body cavity.

Displaying all of the large number of images on an observation apparatus to perform observation and diagnosis would take 72 minutes, a relatively long period of time, even if, e.g., ten images are displayed per second. Accordingly, a surgeon to observe the captured images for such length of time would be quite problematically subject to a high burden of time.

In addition, final diagnosis in endoscopy using a capsule endoscope apparatus or a typical endoscope apparatus largely relied on the subjectivity of a doctor, thus problematically causing fluctuation in the diagnosis quality. For this reason, to improve the quality of image diagnosis and reduce the time for shadow-reading an endoscope-image, it has been expected to realize computer-aided diagnosis (CAD) that allows for automatically detecting from an endoscope image a presence of a lesion such as hemorrhage, reddening, abnormal blood vessel and polyp.

Computer-aided diagnosis (CAD) is realized by an endoscope diagnosis supporting apparatus. The endoscope diagnosis supporting apparatus provides objective and numerical diagnosis assistance by presenting a doctor with whether or not an image to be diagnosed is categorized in such observations by using threshold processing or a statistical or instatistical identification apparatus using various characteristics amounts calculated from a region of interest (ROI) in an image. Also, the endoscope diagnosis supporting apparatus reduces the burden of the doctor in shadow-reading, by selecting and presenting an image doubted to include a lesion.

Meanwhile, several approaches have been used to detect hemorrhage which can be caused by various pathological reasons. One of such approaches is presented in the publication of the PCT WO 02/073507 A2 which proposes a method for automatically detecting hemorrhage based on hue, saturation, and brightness of an observation target area in an endoscope image, using the above-described endoscope diagnosis supporting apparatus.

However, in the method described in the publication, the hue, saturation, and brightness values of the observation target area are compared with hue, saturation, and brightness sample values of a normal mucosa which are preset in the endoscope diagnosis supporting apparatus, and then it is determined whether the observation target area is a normal mucosa or a hemorrhage portion by means of diversion from the sample values.

Thus, there was a problem that the determination results depended on the sample values preset in the endoscope diagnosis supporting apparatus.

Therefore, the present invention aims to provide an image processing apparatus, an image processing method, and an image processing program capable of detecting a hemorrhage area by using an amount of change in an image signal or a color signal in an outline part of a bloody area.

DISCLOSURE OF INVENTION

Means for Solving the Problem

An image processing apparatus of a first aspect of the present invention includes:

a hemorrhage edge candidate area extraction section for extracting a candidate area for the outline part of a hemorrhage area, based on an image signal of a medical image constituted by multiple color signals obtained by capturing an image of a living body;

a feature quantity calculation section for calculating a feature quantity of the hemorrhage area based on calculation of the amount of change in the image signal in a small area including the candidate area, among multiple small areas obtained by dividing the medical image; and a hemorrhage edge determination section for determining whether or not the candidate area is the outline part of the hemorrhage area based on the feature quantity.

An image processing apparatus of a second aspect of the present invention includes:

an evaluation area setting section for dividing a medical image corresponding to a medical image signal constituted by multiple color signals obtained by capturing an image of a living body, into multiple small areas, extracting a small area including the outline part of a hemorrhage area from the multiple small areas based on at least one of the color signals, setting the extracted small area as a hemorrhage evaluation area, and setting evaluation target areas constituted by the multiple small areas, around the hemorrhage evaluation area;

a hemorrhage candidate area determination section for extracting hemorrhage edge candidate areas from the evaluation target areas based on the amount of change in the color signals in the evaluation target areas and determining whether or not the hemorrhage evaluation area is a hemorrhage candidate area based on the ratio of the hemorrhage edge candidate areas to the evaluation target areas; and a hemorrhage area determination section for extracting the outline part of a hemorrhage area from the hemorrhage edge candidate areas based on change in two or more of the color signals in the hemorrhage edge candidate areas and determining whether or not the hemorrhage candidate area is the hemorrhage area based on the ratio of the outline part of the hemorrhage area to the hemorrhage edge candidate areas.

BRIEF DESCRIPTION OF THE DRAWINGS

FIG. 5 is a schematic diagram for illustrating analysis data, wherein: FIG. 5(a) is a schematic diagram illustrating an original image; FIG. 5(b) is a schematic diagram illustrating a bleeding part edge candidate image; FIG. 5(c) is a schematic diagram illustrating a shape edge image; and FIG. 5(d) is a schematic diagram illustrating a bleeding part edge image;

FIG. 7 is a diagram illustrating a method for calculating R changes;

FIGS. 14(a) and 14(b) show change in the value of the R signal in the case where the bleeding part edge candidate area is a bleeding part edge and change in the value of the R signal in the case where the bleeding part edge candidate area is an edge formed by an element other than bleeding, respectively;

FIG. 20 is a schematic diagram illustrating a method for calculating G changes;

FIG. 22 is a diagram illustrating the bleeding part candidate extraction processing;

FIG. 25 is a diagram illustrating a method for calculating R changes and G changes;

FIG. 29 is a diagram illustrating a pattern of arrangement of peripheral areas in a sixth embodiment.

BEST MODE FOR CARRYING OUT THE INVENTION

Embodiments of the present invention will be described below with reference to drawings.

(First Embodiment)

A first embodiment of the present invention will be described below with reference to FIGS. 1 to 8. The object of this embodiment is to provide an image processing apparatus, an image processing method and an image processing program capable of relatively determining and detecting whether or not an area is a hemorrhage edge or not with the use of the amount of change in color signals at the outline part of a hemorrhage area (hereinafter referred to as a hemorrhage edge).

As examples of the hemorrhage area, a bleeding part area where bleeding from mucous membrane actually occurs, a reddened part area where the surface of mucous membrane is reddened by hyperemia, and the like are given. In this embodiment, the case of detecting, for example, the outline part of a bleeding part area (hereinafter referred to as a bleeding part edge) will be described.

First, description will be made on the network configuration formed by an image processing apparatus 1 according to the first embodiment and its related systems, based on FIG. 1.

Figure 1:
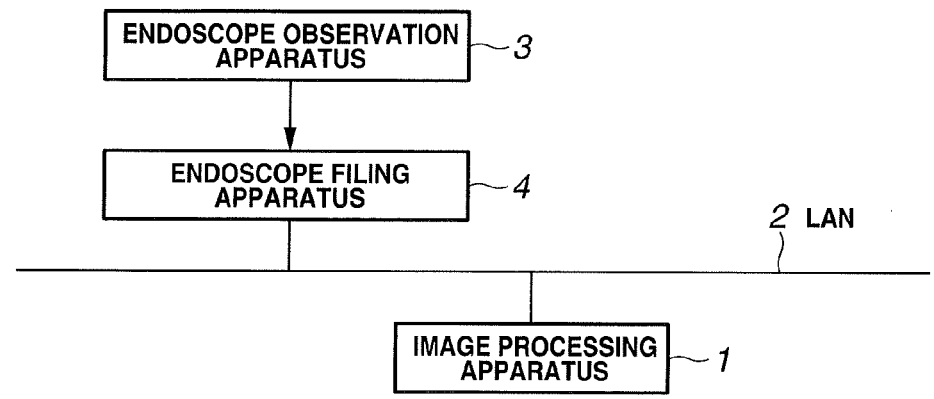
FIG. 1 is a diagram schematically showing the network configuration of an image processing apparatus according to a first embodiment of the present invention and related systems.

FIG. 1 is a diagram schematically showing the network configuration formed by the image processing apparatus 1 according to the first embodiment and its related systems.

As shown in FIG. 1, the image processing apparatus 1 which performs various image processings and information processings is connected to a LAN 2 which uses TCP/IP as its communication protocol. Meanwhile, an endoscope observation apparatus 3 which captures an image of mucous membrane or the like in a living body and outputs an image signal of a medical image is also connected to the LAN 2 via an endoscope filing apparatus 4.

The endoscope filing apparatus 4 receives or acquires an image signal from the endoscope observation apparatus 3 to generate image data, and accumulates the generated image data. Then, the image processing apparatus 1 acquires the image data accumulated in the endoscope filing apparatus 4 via the LAN 2.

Next, the entire configuration of the image processing apparatus 1 will be described. The image processing apparatus 1 is configured with a general-purpose personal computer 11 as its center and provided with an operation device 12 configured by a keyboard and a mouse, a storage device 13 configured by a hard disk and a display device 14 configured by a CRT.

Figure 2:
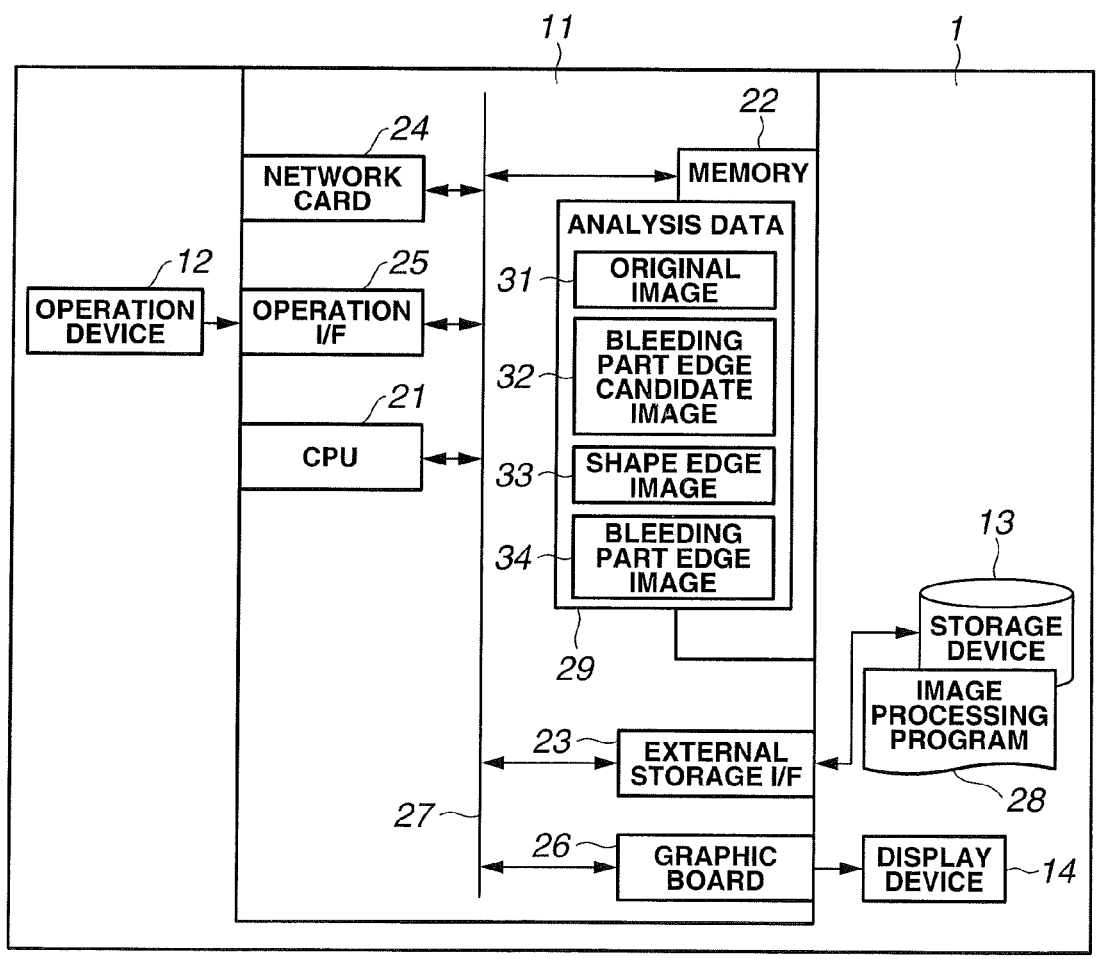
FIG. 2 is a diagram schematically showing the entire configuration of the image processing apparatus.

FIG. 2 is a diagram schematically showing the entire configuration of the image processing apparatus 1. Each of the operation device 12, the storage device 13 and the display device 14 is electrically connected to the personal computer 11. Specification of image data to be processed, acquisition and display of the specified image data and instruction to execute processing are inputted from the operation device 12. The result of various processings performed by the image processing apparatus 1 is displayed on the display device 14.

The personal computer 11 has a CPU 21 which performs execution and control of various programs, a memory 22 which stores the various processing programs and data, an external storage I/F 23 which performs writing and reading of information to and from the storage device 13, a network card 24 which communicates information with external equipment, an operation I/F 25 which receives an operation signal inputted from the operation device 12 and performs necessary data processing, and a graphic board 26 which outputs a video signal to the display device 14. The CPU 21, the memory 22, the external storage I/F 23, the network card 24, the operation I/F 25 and the graphic board 26 which constitute the personal computer 11 are electrically connected with one another via a bus 27. Therefore, these components in the personal computer 11 can mutually send and receive information via the bus 27.

The network card 24 is electrically connected to the LAN 2 and sends and receives information to and from the endoscope filing apparatus 4 which is also connected to the LAN 2.

The external storage I/F 23 reads an image processing program 28 stored in the storage device 13 and stores it in the memory 22. The image processing program 28 is a program which executes image analysis processing and configured by multiple execution files, dynamic link library files or setting files. By the image processing program 28 which is stored in the memory 22 being executed, the CPU 21 operates.

The CPU 21 performs image analysis processing, such as detection and determination of the outline part (edge part) of a hemorrhage area, to be described later for image data acquired from the endoscope filing apparatus 4. Analysis data 29 acquired or generated by each processing by the CPU 21 is stored in the memory 22. This analysis data 29 includes an original image 31 which is the image data acquired from the endoscope filing apparatus 4.

Furthermore, the analysis data 29 includes a bleeding part edge candidate image 32, a shape edge image 33 and a bleeding part edge image 34 generated by various processings to be described later. Each of these images 32 to 34 will be described later in detail. The CPU 21 has functions in FIG. 3 to be described below, that is, a bleeding part edge candidate extraction function, a feature quantity calculation function and a bleeding part edge determination function.

The operation of the image processing apparatus 1 configured as described above will be described. In this embodiment, the case of detecting, for example, the outline part of a bleeding part area (hereinafter referred to as a bleeding part edge) will be described with the use of the flowchart in FIG. 3.

Figure 3:
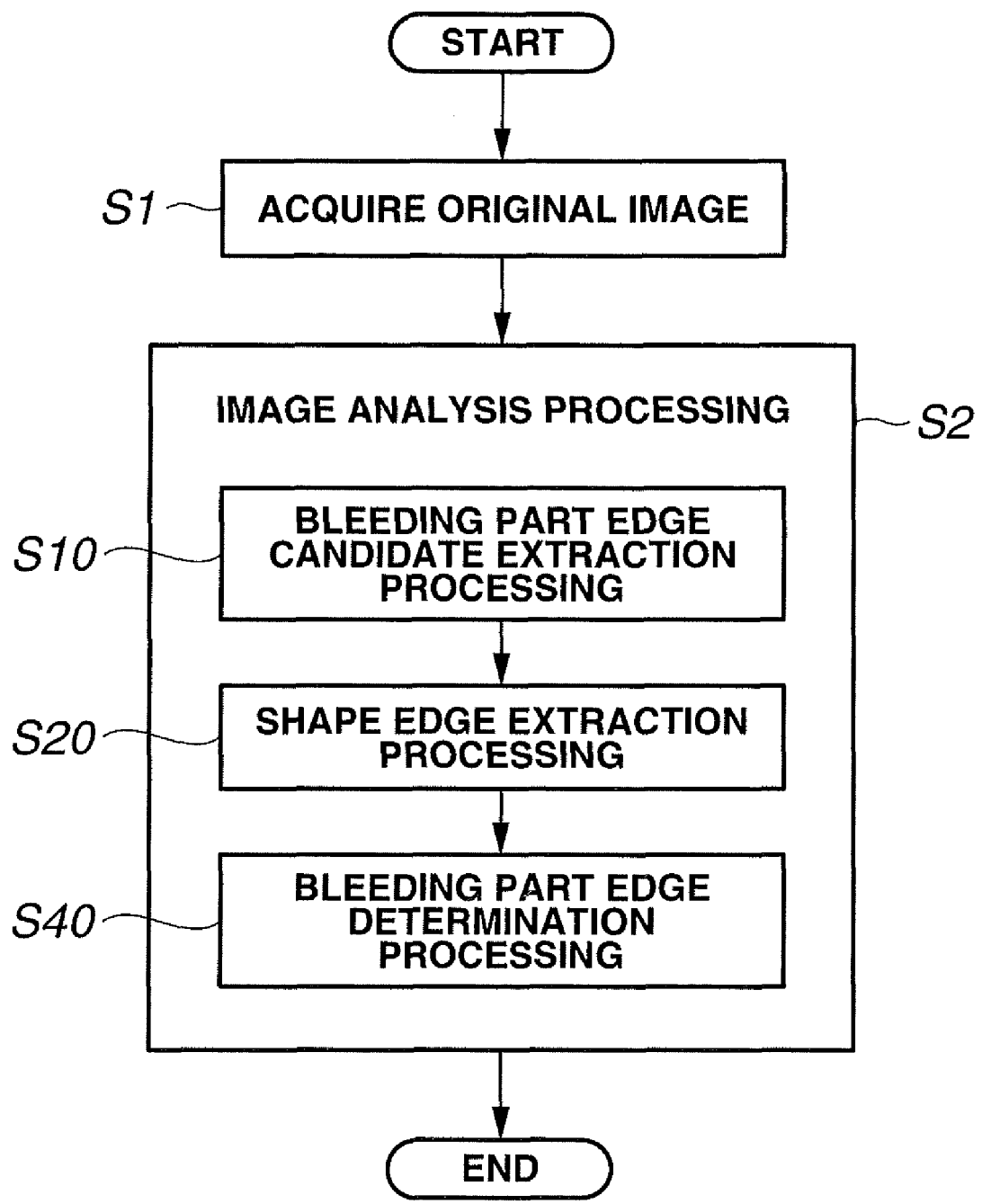
FIG. 3 is a flowchart illustrating the procedure for image analysis processing by an image processing program.

FIG. 3 is a flowchart illustrating the procedure for image analysis processing by the image processing program 28. First, at step S1, which is an original image acquisition step, the CPU 21 acquires image data specified by the operation device 12 from the image filing apparatus 4 and stores it in the memory 22 as the original image 31. The original image 31 is a color image constituted by three planes of red (R), green (G) and blue (B). The tone number of a pixel of each plane takes an 8-bit value, that is, a value between 0 and 255.

Next, at step S2, which is an image analysis processing step, the CPU 21 performs various processings for the original image 31 acquired at step S1 to generate the bleeding part edge candidate image 32, the shape edge image 33 and the bleeding part edge image 34.

This image analysis processing step (step S2) is constituted by bleeding part edge candidate extraction processing (step S10) for generating the bleeding part edge candidate image 32 from the original image 31, shape edge extraction processing (step S20) for generating the shape edge image 33 from the bleeding part edge candidate image 32 based on feature quantity calculation processing, and bleeding part edge determination processing (step S40) for generating the bleeding part edge image 34 from the bleeding part edge candidate image 32 and the shape edge image 33.

There is a possibility that the shape edge image 33 and the bleeding part edge candidate image 32 are generated being mixed with each other, by the feature quantity calculation processing, and the bleeding part edge image 34 is generated by bleeding part edge processing.

The processings of the steps S10, S20 and S40 are executed in that order. Each of the processings in the image analysis processing step (step S2) will be described in accordance with the processing order.

Figure 4:
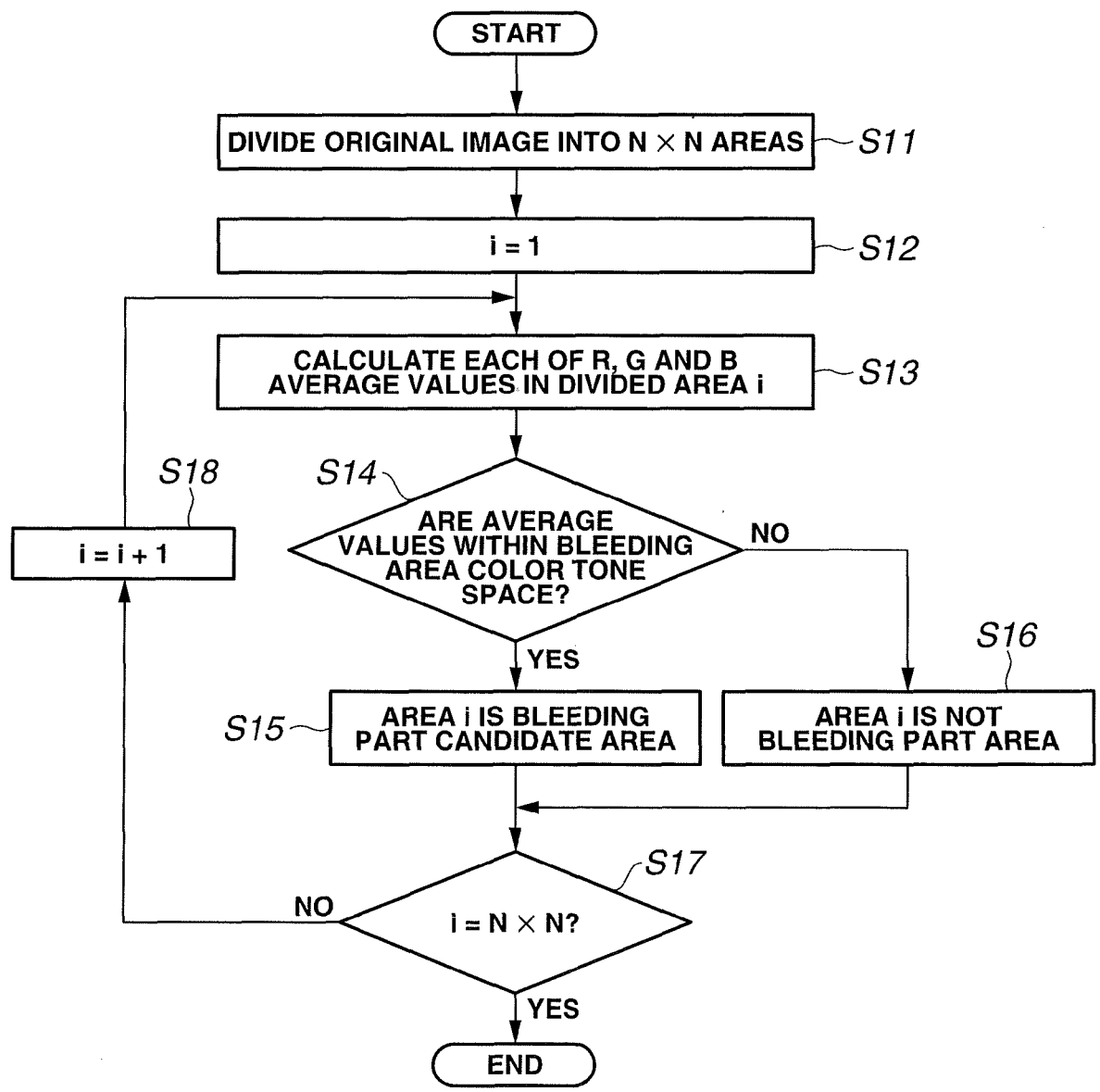
FIG. 4 is a flowchart illustrating the procedure for bleeding part edge candidate extraction processing.

First, the bleeding part edge candidate extraction processing at step S10 will be described with the use of FIG. 4. FIG. 4 is a flowchart illustrating the procedure for the bleeding part edge candidate extraction processing. First, at step S11, the CPU 21 divides the original image 31 into N×N small areas. In this embodiment, for example, N=36 is set.

Reverse gamma correction or shading correction for the original image 31 may be added as preprocessing before step S11. In this case, the corrected image for which the correction processing has been performed is divided into small areas, and subsequent processings are performed therefor.

Next, at step S12, the CPU 21 initializes i which indicates a number identifying the divided small area (hereinafter referred to as a divided area) to be analyzed to 1. The number i identifying the divided area 43 is an integer value equal to or above 1 and equal to or below N×N.

Next, at step S13, the CPU 21 acquires the values (luminance values) of R signals, G signals and B signals of the pixels included in the i-th divided area 43 and calculates average values $Ra_i$, $Ga_i$ and $Ba_i$ of the respective color signals in the i-th divided area 43.

Then, at step S14, the CPU 21 compares a bleeding part area color tone space which has been set in advance and the average values $Ra_i$, $Ga_i$ and $Ba_i$ of the respective color signals calculated at step S13.

The bleeding part area color tone space is an internal space separated into the luminance level range of the R signal (Rminx≦x≦Rmax), the luminance level range of the G signal (Gminy≦x≦Gmax) and the luminance level range of the B signal (Bmin≦z≦Bmax) within which a bleeding part can exist, in a three-dimensional space with the luminance levels of the R signal, the G signal and the B signal indicated by the X axis, the Y axis and the Z axis, respectively.

At step S14, the CPU 21 determines whether or not the average values $Ra_i$, $Ga_i$ and $Ba_i$ of the respective color signals calculated at step S13 exist within the bleeding part area color tone space. If they exist, the CPU 21 proceeds to step S15.

That is, if the calculated average values $Ra_i$, $Ga_i$ and $Ba_i$ of the respective color signals are within the bleeding part area color tone space, that is, if Rmin≦$Ra_i$≦Rmax, Gmin≦$Ga_i$≦Gmax and Bmin≦$Ba_i$≦Bmax are satisfied, then the CPU 21 proceeds to processing at step S15. At this step S15, the CPU 21 determines that the i-th divided area 43 is a bleeding part edge candidate.

On the other hand, if the average values $Ra_i$, $Ga_i$ and $Ba_i$ of the respective color signals calculated at step S13 do not exist within the bleeding part area color tone space, that is, if any of Rmin>$Ra_i$, $Ra_i$>Rmax, Gmin>$Ga_i$, $Ga_i$>Gmax, Bmin>$Ba_i$ and $Ba_i$>Bmax is satisfied, then the CPU 21 proceeds to processing at step S16. At this step S16, the CPU 21 determines that the i-th divided area 43 is not a bleeding part edge candidate.

It is also possible to use a color tone space of G/R and B/G to determine a bleeding part edge candidate. That is, if (G/R)min≦$Ga_i/Ra_i$≦(G/R)max and (B/G)min≦$Ba_i/Ga_i$≦(B/G)max are satisfied, then the CPU 21 determines that the i-th divided area 43 is a bleeding part edge candidate.

Here, (G/R)min and (G/R)max indicate the smallest value and the largest value of G/R, respectively. And, (B/G)min and (B/G)max indicate the smallest value and the largest value of B/G, respectively.

When the processing at step S15 or S16 ends, the CPU 21 then determines whether or not the bleeding part edge candidate determination has been performed for all the divided areas 43, at step S17.

Specifically, if i<N×N is satisfied, then the CPU 21 adds 1 to the number i identifying the divided area 43 (i=i+1) at step S18 and returns to step S13 to perform the bleeding part edge candidate determination processing for the remaining divided areas. If i=N×N is satisfied, the CPU 21 terminates the processing in FIG. 4 (that is, the bleeding part edge candidate extraction processing at step S10 in FIG. 3) and proceeds to the shape edge extraction processing at the subsequent step S20 in FIG. 3.

When the bleeding part edge candidate extraction processing ends, a bleeding edge candidate image 32 as shown in FIG. 5(b) is generated from an original image 31 as shown in FIG. 5(a). FIGS. 5(a) to 5(d) are schematic diagrams illustrating the analysis data 29.

That is, FIG. 5(a) is a schematic diagram illustrating an original image 31; FIG. 5(b) is a schematic diagram illustrating a bleeding part edge candidate image 32; FIG. 5(c) is a schematic diagram illustrating a shape edge image 33; and FIG. 5(d) is a schematic diagram illustrating a bleeding part edge image 34.

In the original image 31 in FIG. 5(a), there exist a mucous membrane shape area 41, such as a groove formed on the surface of mucous membrane, and a bleeding part area 42. In the bleeding part edge candidate image 32 shown in FIG. 5(b) which has been obtained based on the original image 31, all divided areas 43 are classified as any of bleeding part edge candidate areas 44 (shaded area) and non bleeding part edge candidate areas 45, and the bleeding part edge candidate areas 44 include the mucous membrane shape area 41 and the bleeding part area 42.

Figure 6:
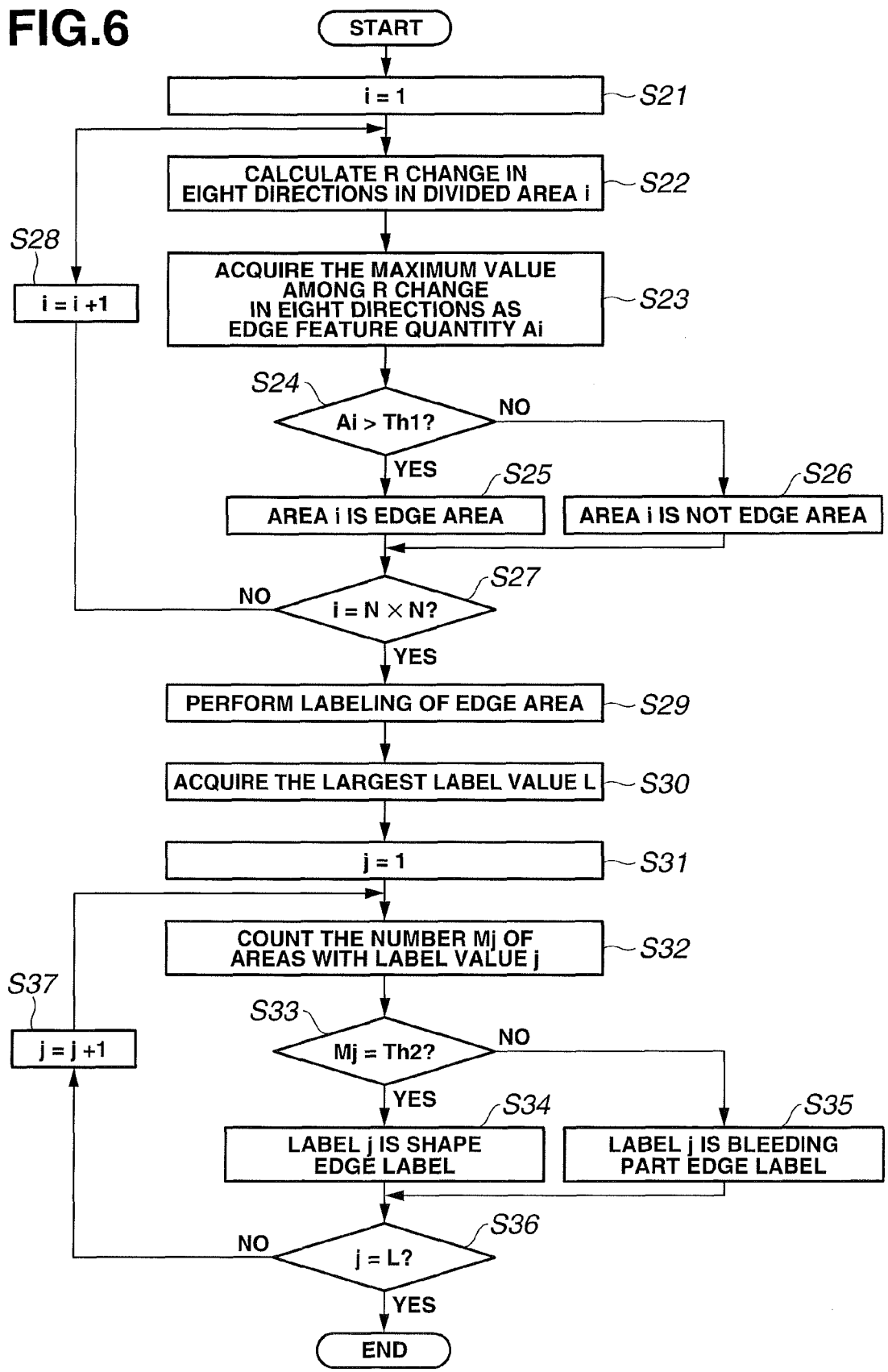
FIG. 6 is a flowchart illustrating the procedure for shape edge extraction processing.

Next, the shape edge extraction processing will be described with the use of FIG. 6. FIG. 6 is a flowchart illustrating the procedure for the shape edge extraction processing at step S20 in FIG. 3.

In this shape edge extraction processing, the CPU 21 performs processing for extracting the outline part of the mucous membrane shape area 41 (hereinafter referred to as a shape edge) as a shape edge area formed by a large area in which multiple divided areas 43 are connected. First, at step S21, the CPU 21 initializes i which indicates the number identifying the divided area 43 to be analyzed, to 1. The number i identifying the divided area 43 is an integer value equal to or above 1 and equal to or below N×N.

Next, at step S22, the CPU 21 calculates change in the value of the R signal (hereinafter referred to as R change) in the i-th divided area 43. The R change is calculated from the value of the R signal of a particular pixel (R1) in the i-th divided area 43 and the value of the R signal of a different particular pixel (R2) in the same divided area 43. Specifically, the CPU 21 performs the calculation with the formula of R change=$\log_e(R2) - \log_e(R1)$.

In this embodiment, the CPU 21 calculates the R change for each of eight directions, that is, upward and downward directions, right and left directions and diagonal directions in the divided area 43, as shown in FIG. 7. FIGS. 7(a) to 7(h) are diagrams illustrating a method for calculating the R changes.

First R change is upward R change as shown in FIG. 7(a), and it is calculated with the value of the R signal of the pixel at the lower center as R1 and the value of the R signal of the pixel at the upper center as R2. Second R change is R change toward the diagonally upper-right direction as shown in FIG. 7(b), and it is calculated with the value of the R signal of the pixel at the lower left as R1 and the value of the R signal of the pixel at the upper right as R2. Third R change is R change toward the right direction as shown in FIG. 7(c), and it is calculated with the value of the R signal of the pixel at the left center as R1 and the value of the R signal of the pixel at the right center, as R2.

Fourth R change is R change toward the diagonally lower-right direction as shown in FIG. 7(d), and it is calculated with the value of the R signal of the pixel at the upper left as R1 and the value of the R signal of the pixel at the lower right as R2. Fifth R change is downward R change as shown in FIG. 7(e), and it is calculated with the value of the R signal of the pixel at the upper center as R1 and the value of the R signal of the pixel at the lower center as R2. Sixth R change is R change toward the diagonally lower-left direction as shown in FIG. 7(f), and it is calculated with the value of the R signal of the pixel at the upper right as R1 and the value of the R signal of the pixel at the lower left as R2.

Seventh R change is R change toward the left direction as shown in FIG. 7(g), and it is calculated with the value of the R signal of the pixel at the right center as R1 and the value of the R signal of the pixel at the left center as R2. Eighth R change is R change toward the diagonally upper-left direction as shown in FIG. 7(h), and it is calculated with the value of the R signal of the pixel at the lower right as R1 and the value of the R signal of the pixel at the upper left as R2.

Next, at step S23, the CPU 21 acquires the largest value among the first to eighth R changes calculated at step S22 as an edge feature quantity $A_i$. Next, at step S24, the CPU 21 determines whether or not the i-th divided area 43 is an edge. Specifically, if the edge feature quantity $A_i$>Th1 is satisfied, then it is determined that the i-th divided area 43 is an edge.

Here, Th1 is a threshold to be a reference used when edge determination is performed, and, for example, Th1=0.14 is set in this embodiment. If $A_i$>Th1 is satisfied, then the CPU 21 determines at step S25 that the i-th divided area 43 is an edge and proceeds to processing at step S27. If $A_i$≦Th1 is satisfied, the CPU 21 determines at step S26 that the i-th divided area 43 is not an edge and proceeds to processing at step S27.

At step S27, the CPU 21 determines whether or not the edge determination has been performed for all the divided areas 43. Specifically, if i<N×N is satisfied, then the CPU 21 adds 1 to the number i identifying the divided area 43 (i=i+1) at step S28 and returns to step S22 to perform the edge determination at steps S22 to S26 for the remaining divided areas 43. If i=N×N is satisfied, then the CPU 21 terminates the edge determination processing and proceeds to processing at step S29.

At step S29, the CPU 21 performs labeling processing for the areas which have been determined to be edges at step S25 among the N×N divided areas 43. The labeling processing in this embodiment is performed as described below.

The CPU 21 scans image data sequentially from the upper left to the lower right to find a divided area 43 which is not labeled and which has been determined to be an edge area and give it a predetermined number as a label value.

In this case, the CPU 21 does not use a label value already given to another divided area 43 and gives the divided area 43 a value obtained by adding 1 to the largest value among already given label values.

If no divided area 43 is given a label value, then the CPU 21 gives, for example, 1 to the divided area 43 as a label value. Next, the CPU 21 gives the same label value to all such divided areas 43 as are connected to the divided area 43 which has been given the label value and are determined to be an edge area.

The CPU 21 repeats the scanning and the label-value giving described above until a label value is given to all the divided areas 43 determined to be an edge area. That is, the same label value is given to divided areas 43 belonging to the same connection part, and a different label value is given to each connection part.

Next, at step S30, the CPU 21 acquires the largest value among the label values given to the N×N divided areas 43 at step S29, as L. Subsequently, at step S31, the CPU 21 initializes j which indicates a connected, divided area 43 to be analyzed, to 1. The label value j identifying the connected, divided area 43 takes an integer value equal to or above 1 and equal to or below L. Next, at step S32, the CPU 21 counts the number of divided areas 43 having the label value j and acquires the counted number of areas $M_j$.

Subsequently, at step S33, the CPU 21 performs label classification determination for determining whether the label value j is a shape edge label or a bleeding part edge label. Specifically, if the number of areas $M_j$>Th2 is satisfied, then the CPU 21 determines the label value j is a shape edge label. Here, Th2 is a threshold to be a reference value used for determining whether the label is a shape edge label or a bleeding part edge label, and, for example, Th2=10 is set in this embodiment. If $M_j$>Th2 is satisfied, then the CPU 21 determines at step S34 that the label value j is a shape edge label and proceeds to processing at step S36. If $M_j$Th2 is satisfied, then the CPU 21 determines at step S35 that the label value j is a bleeding part edge label and proceeds to the processing at step S36.

At step S36, the CPU 21 determines whether or not the label classification determination has been performed for all the divided areas 43 determined to be edges.

Specifically, if j<L is satisfied, then the CPU 21 adds 1 to the label value j identifying the connected, divided area 43 (j=j+1) at step S37 and returns to step S32 to perform the label classification determination at steps S32 to S35 for the remaining divided areas. If j=L is satisfied, the CPU 21 terminates the processing in FIG. 6 and then proceeds to the bleeding part edge determination processing at step S40 in FIG. 3.

When the shape edge extraction processing in FIG. 6 ends, a shape edge image 33 as shown in FIG. 5(c) is generated. In the shape edge image 33 shown in FIG. 5(c), divided areas 43 with a label value classified as the shape edge label are shown as shape edge areas 46 (shaded areas). The shape edge areas 46 correspond to the divided areas 43 corresponding to the outline part of the mucous membrane shape area 41 among the bleeding part edge candidate areas 44.

Figure 8:
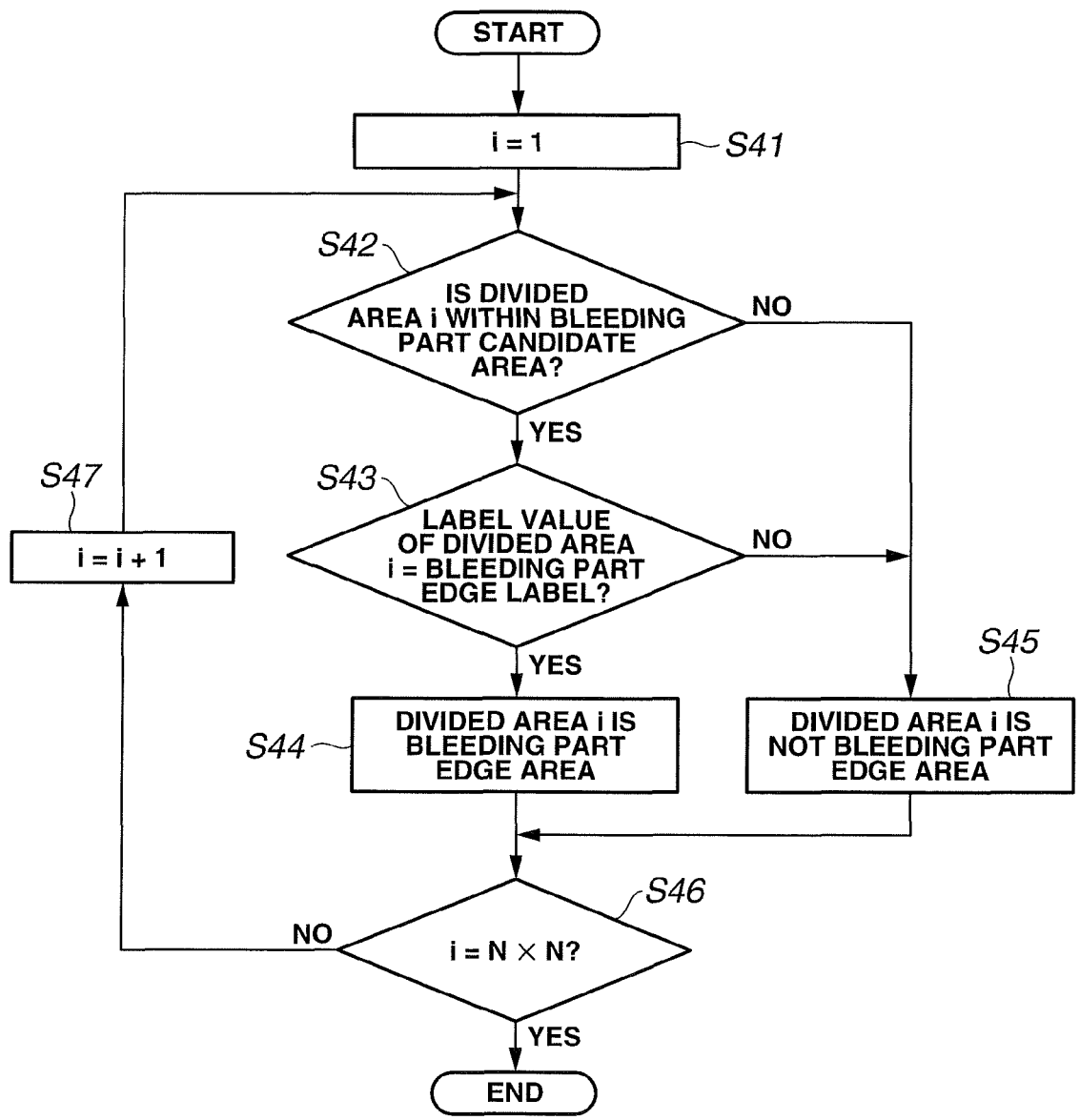
FIG. 8 is a flowchart illustrating the procedure for bleeding part edge determination processing.

Next, the bleeding part edge determination processing at step S40 in FIG. 3 will be described with the use of FIG. 8. FIG. 8 is a flowchart illustrating the procedure for the bleeding part edge determination processing.

In the bleeding part edge determination processing, the CPU 21 performs processing for determining bleeding part edge areas 47 among the bleeding part edge candidate areas 44 extracted by the bleeding part edge candidate extraction processing. First, at step S41, the CPU 21 initializes i which indicates the number identifying the divided area 43 to be analyzed, to 1.

The number i identifying the divided area 43 is an integer value equal to or above 1 and equal to or below N×N. Next, at step S42, the CPU 21 determines whether or not the i-th divided area 43 is a bleeding part edge candidate area 44.

The determination processing at step S42 is performed based on the result of the bleeding part edge candidate extraction processing at step S10 in FIG. 3. If the i-th divided area 43 is a bleeding part edge candidate area 44, then the CPU 21 proceeds to processing at step S43 and determines whether or not the label value given to the i-th divided area 43 is the bleeding part edge label. If the i-th divided area 43 is not a bleeding part edge candidate area 44, then the CPU 21 determines that the divided area is not the bleeding part edge area 47 and proceeds to step S46.

The determination at step S43 is performed based on the result of the shape edge extraction processing at step S20 in FIG. 3. If the label value given to the i-th divided area 43 is a bleeding part edge label, then the CPU 21 determines at step S44 that the i-th divided area 43 is the bleeding part edge area 47 and proceeds to step S46.

If the label value given to the i-th divided area 43 is not a bleeding part edge label, that is, if the label value given to the i-th divided area 43 is a shape edge label or no label is given thereto, then the CPU 21 determines at step S45 that the divided area is not the bleeding part edge area 47 and proceeds to step S46.

At step S46, the CPU 21 determines whether or not the bleeding part edge area determination has been performed for all the divided areas 43. Specifically, if i<N×N is satisfied, then the CPU 21 adds 1 to the number i identifying the divided area 43 (i=i+1) at step S47 and returns to step S42 to perform the bleeding part edge area determination for the remaining divided areas 43. If i=N×N is satisfied, then the CPU 21 terminates the bleeding part edge determination processing in FIG. 8.

Figure 5:
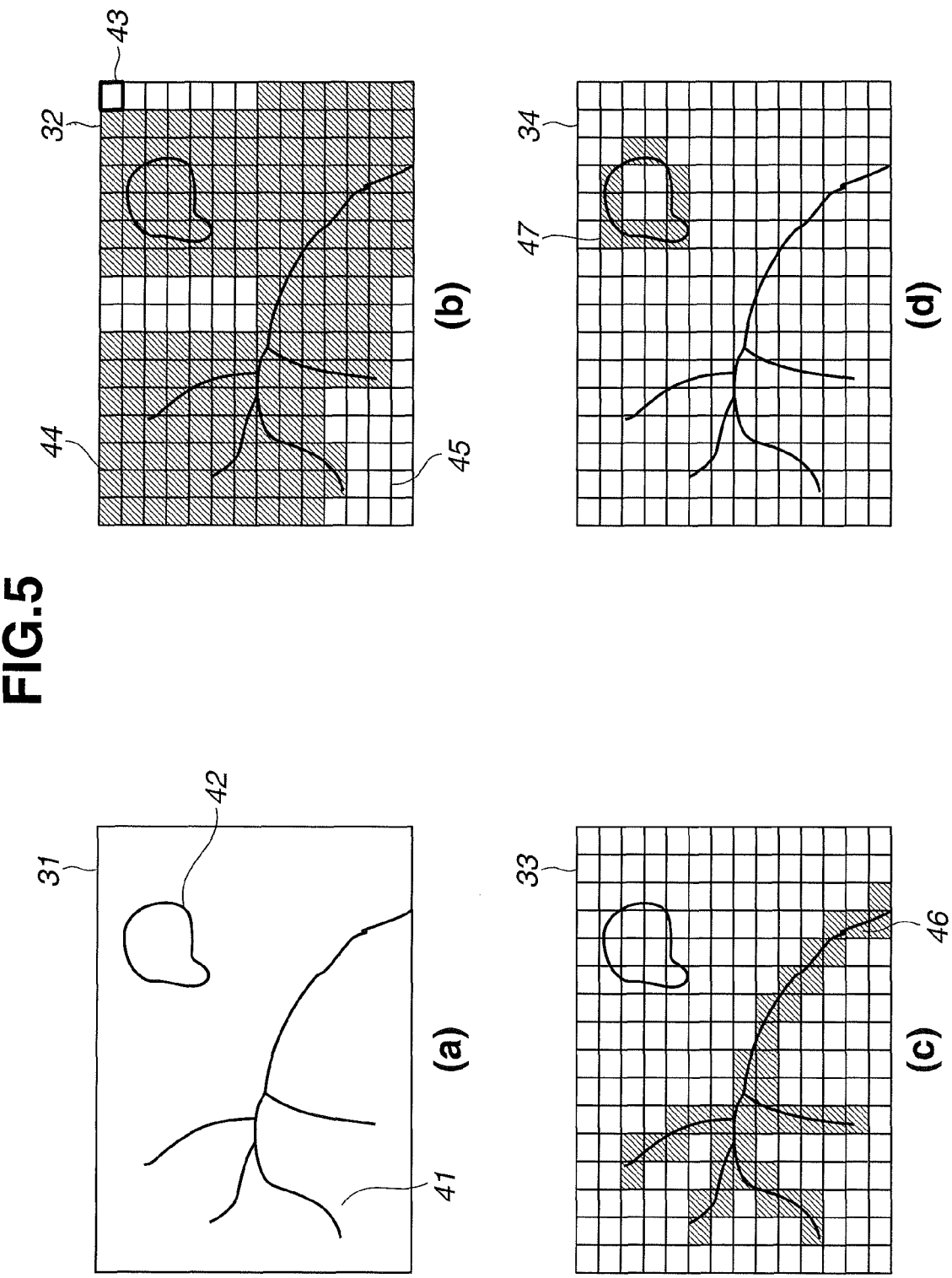

When the bleeding part edge determination processing ends, a bleeding part edge image 34 as shown in FIG. 5(*d*) is generated. In the bleeding part edge image 34 shown in FIG. 5(*d*), the outline part of the bleeding part area 42 in the original image 31 shown in FIG. 5(*a*), that is, a bleeding part edge is displayed as the bleeding part edge areas 47 (shaded part).

Through the above processings, the image processing apparatus 1 can acquire the original image 31 captured by the endoscope observation apparatus 3 via the image filing apparatus 4 and detect a bleeding part edge in the original image 31.

As described above, in the image processing apparatus 1 of this embodiment, it is possible to relatively determine and detect whether or not a divided area is a bleeding part edge by using the amount of change in particular color signals in a bleeding part edge. Furthermore, in this embodiment, since whether an edge is a shape edge or a bleeding part edge is determined based on the size of the edge, it is possible to precisely extract a bleeding part edge. Furthermore, according to this embodiment, an operator can improve the quality of imaging diagnosis and shorten the time required for interpretation of an endoscope image by observing a bleeding part edge image 34.

(Second Embodiment)

Next, a second embodiment of the present invention will be described. In the first embodiment described above, an edge area is extracted with the use of an edge feature quantity $A_i$, which is the largest value of change of an R signal, and it is determined whether or not the edge area is a bleeding part edge based on the size of the edge area. On the other hand, in this embodiment, a color edge feature quantity $B_i$ is calculated based on change of two or more color signals among the R signal, the G signal and the B signal, and it is determined whether or not an edge area is a bleeding part edge, with the use of the color edge feature quantity $B_i$.

The hardware configuration of the image processing apparatus 1 of this embodiment is the same as that of the image processing apparatus 1 in FIG. 2. An image processing program 51 different from the image processing program 28 stored in the storage device 13 in FIG. 2 is stored. Furthermore, the analysis data stored in the memory 22 includes two kinds of image data, that is, the original image 31 and the bleeding part edge image 34, unlike the case in FIG. 2.

That is, the image processing apparatus 1 of this embodiment is the same as to that of the first embodiment except that the content of the processing performed by the image processing program 51 is different, and that analysis data 52 acquired, generated and stored in the memory 22 by executing the image processing program 51 includes the two kinds of data, the original image 31 and the bleeding part edge image 34, and does not include the bleeding part edge candidate image 32 and the shape edge image 33. Therefore, only characteristic operations will be described in this embodiment. The same components will be given the same reference numerals, and description thereof will be omitted.

Figure 9:
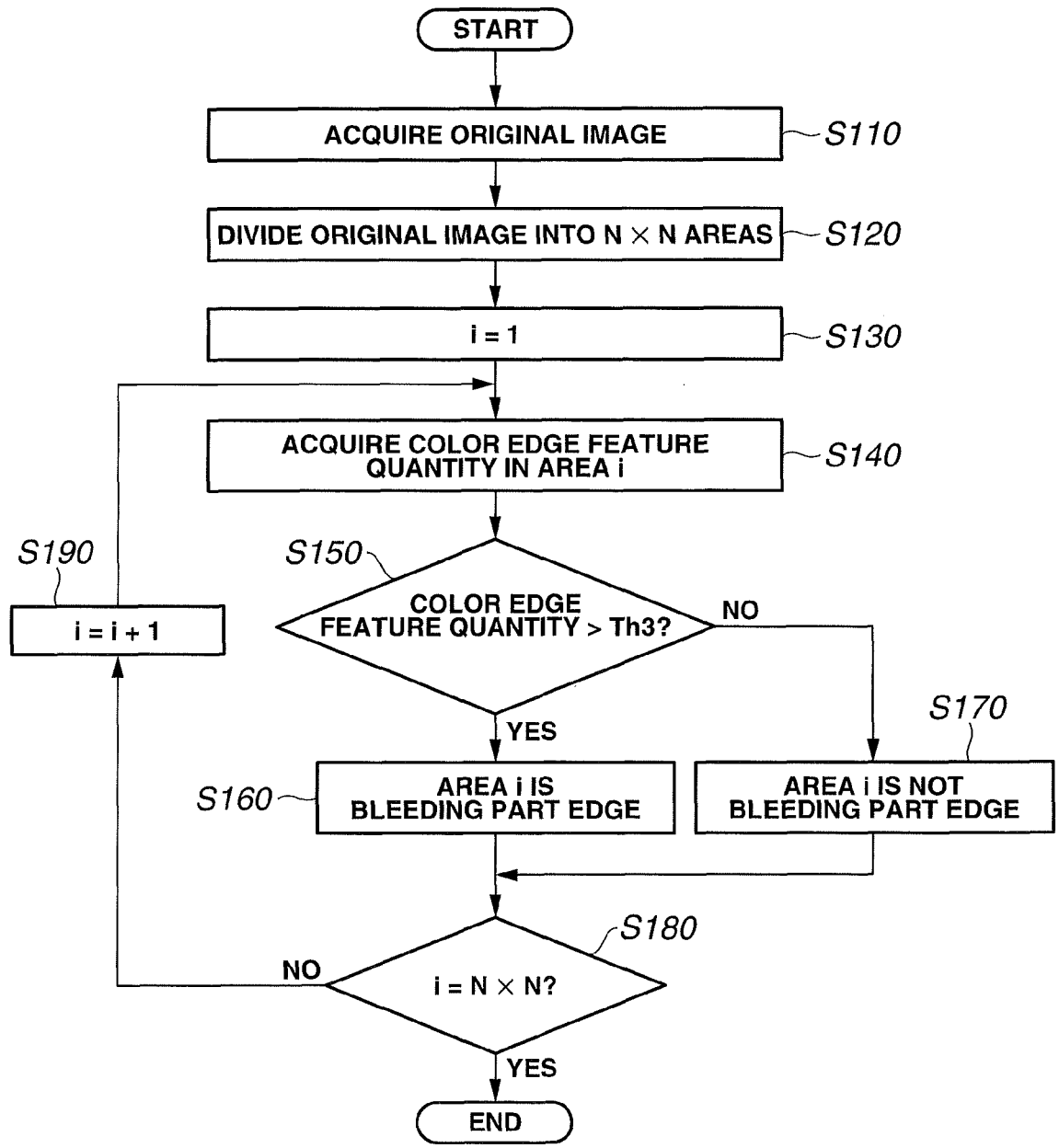
FIG. 9 is a flowchart illustrating the procedure for image analysis processing by an image processing program in a second embodiment of the present invention.

In this embodiment, processing for detecting, for example, a bleeding part edge will be described with the use of the flowchart in FIG. 9, similarly to the first embodiment. FIG. 9 is a flowchart illustrating the procedure for image analysis processing by the image processing program 51.

First, at step S110, the CPU 21 acquires image data specified by the operation device 12 from the image filing apparatus 4 and stores it in the memory 22 as an original image 31. Next, at step S120, the CPU 21 divides the original image 31 acquired at step S110 to generate N×N divided areas 43. Next, at step S130, the CPU 21 initializes i which indicates the number identifying the divided area 43 to be analyzed, to 1. The number i identifying the divided area 43 is an integer value equal to or above 1 and equal to or below N×N.

Figure 10:
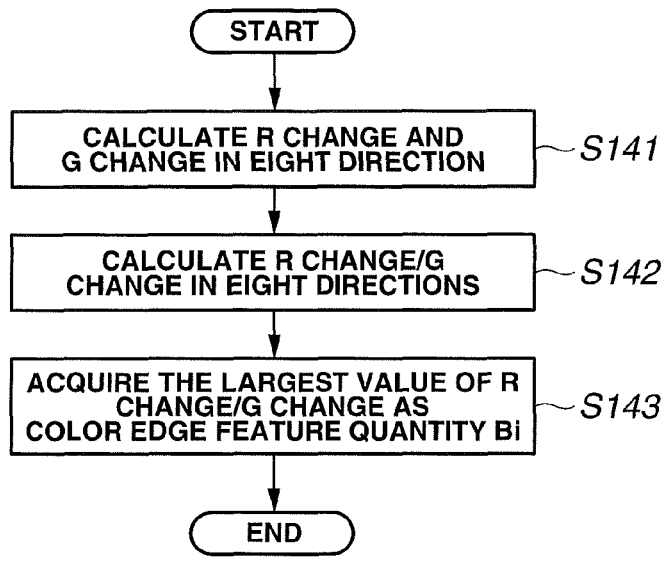
FIG. 10 is a flowchart illustrating the procedure for calculating a color edge feature quantity.

Next, at step S140, the CPU 21 calculates the color edge feature quantity $B_i$ in the i-th divided area 43. The procedure for calculating the color edge feature quantity at step S140 will be described with the use of the flowchart in FIG. 10. FIG. 10 is a flowchart illustrating the procedure for calculating the color edge feature quantity.

First, at step S141, the CPU 21 calculates change in the value of the R signal (hereinafter referred to as R change) and change in the value of the G signal (hereinafter referred to as G change) in the i-th divided area 43. The R change is calculated from the value of the R signal (R1) of a particular pixel P1 in the divided area 43 and the value of the R signal (R2) of a different particular pixel P2 in the same divided area 43. Specifically, the CPU 21 performs calculation with the formula of R change=$\log_e(R2)-\log_e(R1)$.

Figure 11:
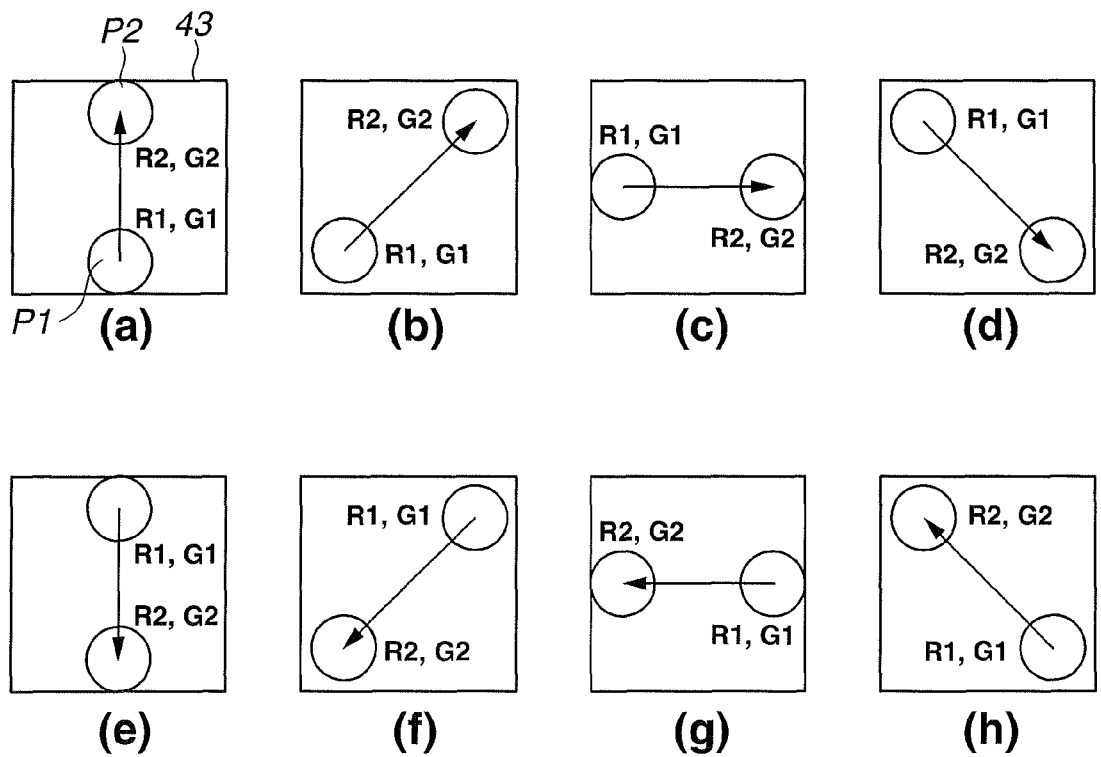
FIG. 11 is a diagram illustrating a method for calculating R changes and G changes.

The G change is calculated from the value of the G signal (G1) of the pixel P1 used when the R change is calculated and the value of the G signal (G2) of the pixel P2. Specifically, the G change is calculated by the CPU 21 with G change=$\log_e(G2)-\log_e(G1)$. In this embodiment, the CPU 21 calculate the R change and the G change for each of eight directions, that is, upward and downward directions, right and left directions and diagonal directions in the divided area 43, as shown in FIG. 11. FIG. 11 is a diagram illustrating a method for calculating the R changes and the G changes. Since the method for calculating the first to eighth R changes shown in FIG. 11 is similar to the method for calculating the first to eighth R changes shown in FIG. 7, description thereof will be omitted.

The method for calculating the first to eighth G changes shown in FIG. 11 uses the same pixels used in calculation of the first to eighth R changes, and the method is similar to the method for calculating the first to eighth R changes if R1 and R2, the values of the R signal, are substituted with G1 and G2, the values of the G signal, respectively. Therefore, description of the method will be omitted.

Next, at step S142, the CPU 21 determines the first to eighth change ratios by dividing the first to eighth G changes by the first to eighth R changes, respectively. At the subsequent step S143, the CPU 21 acquires the largest value among the first to eighth change ratios determined at step S142 as a color edge feature quantity $B_i$.

In the vicinity of a boundary area between peripheral mucous membrane and a bleeding part, that is, in the vicinity of a bleeding part edge, change in the G signal is generally larger than change in the R signal or the B signal. Therefore, in this embodiment, the largest value of G change/R change is assumed to be the color edge feature quantity $B_i$. The CPU 21 may use the largest value of B change/R change as the color edge feature quantity $B_i$.

Next, at step S150 in FIG. 9, the CPU 21 determines whether or not the i-th divided area 43 is a bleeding part edge. Specifically, if the color edge feature quantity $B_i$>Th3 is satisfied, then the CPU 21 determines that the i-th divided area 43 is a bleeding part edge.

Here, Th3 is a threshold to be a reference value used when it is determined that a divided area is a bleeding part edge, and, for example, Th3=0.1 is set in this embodiment. If $B_i$>Th3 is satisfied, then the CPU 21 determines at step S160 that the i-th divided area 43 is a bleeding part edge and proceeds to processing at step S180.

If $B_i \leq Th3$ is satisfied, then the CPU 21 determines at step S170 that the i-th divided area 43 is not a bleeding part edge and proceeds to processing at step S180.

At step S180, the CPU 21 determines whether or not the bleeding part edge determination has been performed for all the divided areas 43. Specifically, if i<N×N is satisfied, then the CPU 21 adds 1 to the number i identifying the divided area 43 (i=i+1) at step S190 and returns to step S140 to perform the bleeding part edge determination for the remaining divided areas. If i=N×N is satisfied, then the CPU 21 terminates the processing in FIG. 9.

As described above, in the image processing apparatus 1 of this embodiment, whether or not a divided area is a bleeding part edge is determined with the use of a color edge feature quantity $B_i$ calculated based on change of two or more color signals among the R signal, the G signal and the B signal, it is possible to relatively determine and detect whether or not the divided area is a bleeding part edge. Furthermore, in this embodiment, since it is possible to extract bleeding part edges with various sizes, such as a bleeding part with a large area and a bleeding part where an edge is extracted being divided, the precision of detecting a bleeding part edge is further enhanced.

(Third Embodiment)

Next, a third embodiment of the present invention will be described. In the first embodiment described above, whether or not a divided area is a bleeding part edge is determined with the use of an edge feature quantity on which the amount of change in color signals in a bleeding part edge is reflected. In this embodiment, an edge feature quantity is also calculated for peripheral areas, and whether or not a divided area is a bleeding part edge is determined by evaluating continuity of the edge feature quantity from the peripheral areas to a bleeding part edge.

In the image processing apparatus 1 of this embodiment, an image processing program 61, the processing content of which is different from that of the image processing program of the image processing apparatus 1 in FIG. 2, is used. The image processing apparatus 1 of this embodiment is the same as that of the first embodiment except that analysis data 62 acquired, generated and stored in the memory 22 by executing the image processing program 61 includes two kinds of image data, the original image 31 and the bleeding part edge image 34 and does not include the bleeding part edge candidate image 32 and the shape edge image 33. Therefore, only characteristic operations will be described here. The same components will be given the same reference numerals, and description thereof will be omitted.

Figure 12:
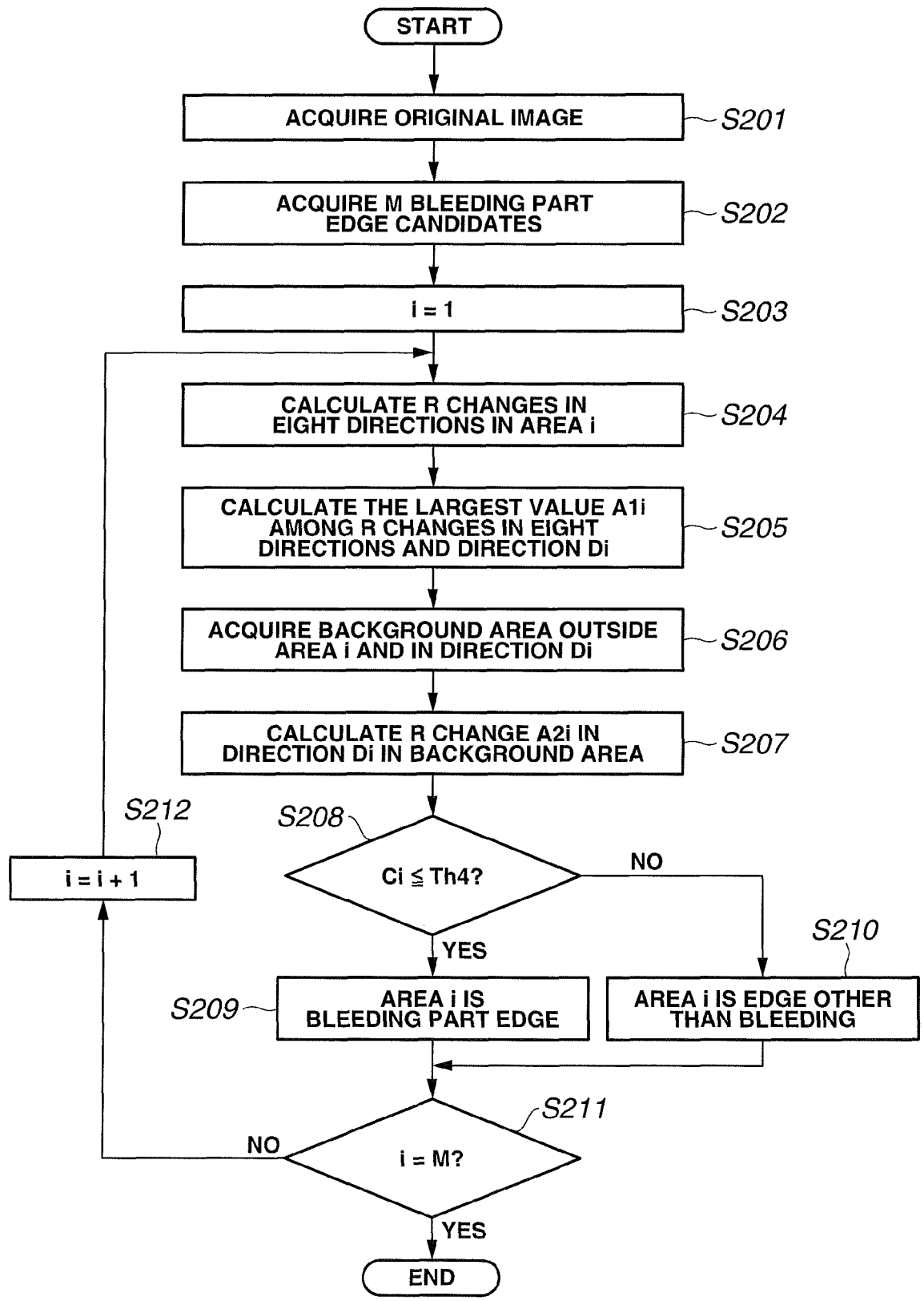
FIG. 12 is a flowchart illustrating the procedure for image analysis processing by an image processing program in a third embodiment of the present invention.

In this embodiment, processing for detecting, for example, a bleeding part edge will be described with the use of the flowchart in FIG. 12, similarly to the first embodiment. FIG. 12 is a flowchart illustrating the procedure for image analysis processing by the image processing program 61.

First, at step S201, the CPU 21 acquires image data specified by the operation device 12 from the image filing apparatus 4 and stores it in the memory 22 as an original image 31. At the next step S202, the CPU 21 generates N×N divided areas 43 from the original image 31 acquired at step S201 and extracts bleeding part edge candidate areas 44. Since the processing at step S202 is similar to the bleeding part edge candidate extraction processing described with the use of FIG. 4 in the first embodiment, description thereof will be omitted.

At the next step S203, the CPU 21 initializes i which indicates the number identifying the bleeding part edge candidate area 44 to be analyzed, to 1. The number i identifying the bleeding part edge candidate area 44 is an integer value equal to or above 1 and equal to or below M. Here, M is the number of divided areas 43 extracted as the bleeding part edge candidate areas 44 at step S202.

At the subsequent step S204, the CPU 21 calculates the first to eighth R changes in the i-th bleeding part edge candidate area 44. Since the method for calculating the R changes at step S204 is similar to the method described with the use of FIG. 7 in the first embodiment, description thereof will be omitted.

At the next step S205, setting the largest value among the first to eighth R changes calculated at step S204 as an edge feature quantity $A1_i$, the CPU 21 calculates the direction in which the R change is the largest, as $D_i$. For example, if the fourth R change is the largest, then the direction $D_i$ is the diagonally lower-right direction as shown in FIG. 7(d). The two feature quantities, that is, the edge feature quantity $A1_i$ and the direction $D_i$ are collectively referred to as a candidate area continuity feature quantity.

Figure 13:
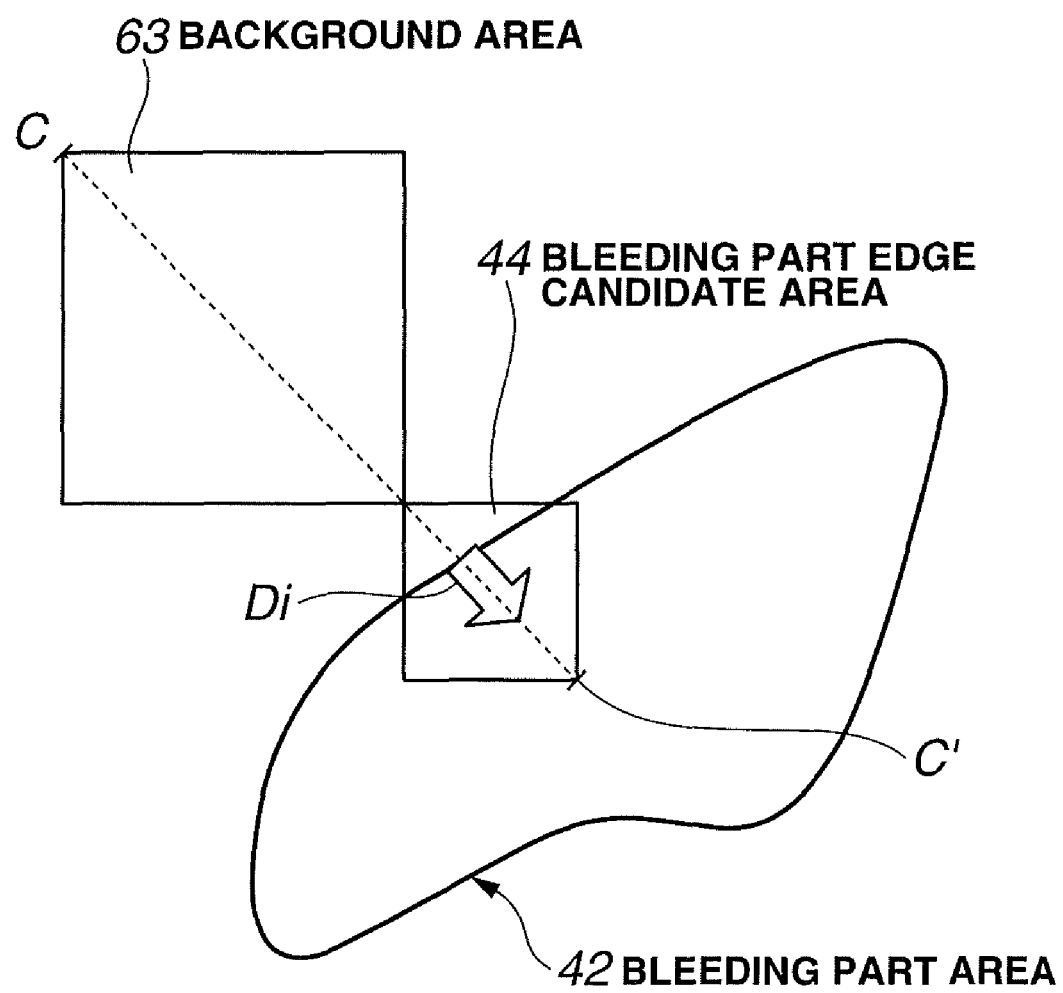
FIG. 13 is a schematic diagram illustrating the relation between a bleeding part edge candidate area and a background area.

Subsequently, at step S206, the CPU 21 sets a background area 63 related to the i-th bleeding part edge candidate area 44, as shown in FIG. 13. FIG. 13 is a schematic diagram illustrating the relation between the bleeding part edge candidate area 44 and the background area 63.

The background area 63 is an area required for evaluating the continuity of the edge feature quantity, and it is positioned to be adjacent to the i-th bleeding part edge candidate area 44, in the direction opposite to the direction $D_i$ determined at step S205 when seen from the center of the i-th bleeding part edge candidate area 44. The background area 63 is in 1:k similarity relation with the bleeding part edge candidate area 44, and, for example, k=2 is set in this embodiment as shown in FIG. 13.

At the next step S207, the CPU 21 calculates the R change in the direction $D_i$ in the background area 63 as a background area continuity feature quantity $A2_i$. Since the method for calculating the R change is similar to the method for calculating the R changes in the bleeding part edge candidate area 44, description thereof will be omitted.

At the next step S208, the CPU 21 determines whether or not the i-th bleeding part edge candidate area 44 is a bleeding part edge. Specifically, a value obtained by dividing the background area continuity feature quantity $A2_i$ by the edge feature quantity $A1_i$ is assumed to be a continuity evaluation feature quantity $C_i$, and if $C_i \leq Th4$ is satisfied, then it is determined that the i-th bleeding part edge candidate area 44 is a bleeding part edge. Here, Th4 is a threshold to be a reference value used when it is determined that a bleeding part edge candidate area is a bleeding part edge, and, for example, Th4=0.2 is set in this embodiment.

As shown in FIG. 14(a), if $C_i \leq Th4$ is satisfied, the CPU 21 determines at step S209 that the i-th bleeding part edge candidate area 44 is a bleeding part edge and proceeds to step S211. As shown in FIG. 14(b), if $C_i > Th4$ is satisfied, the CPU 21 determines at step S210 that the i-th bleeding part edge candidate area 44 is not a bleeding part edge but an edge formed by an element other than bleeding and proceeds to processing at step S211.

Figure 14:
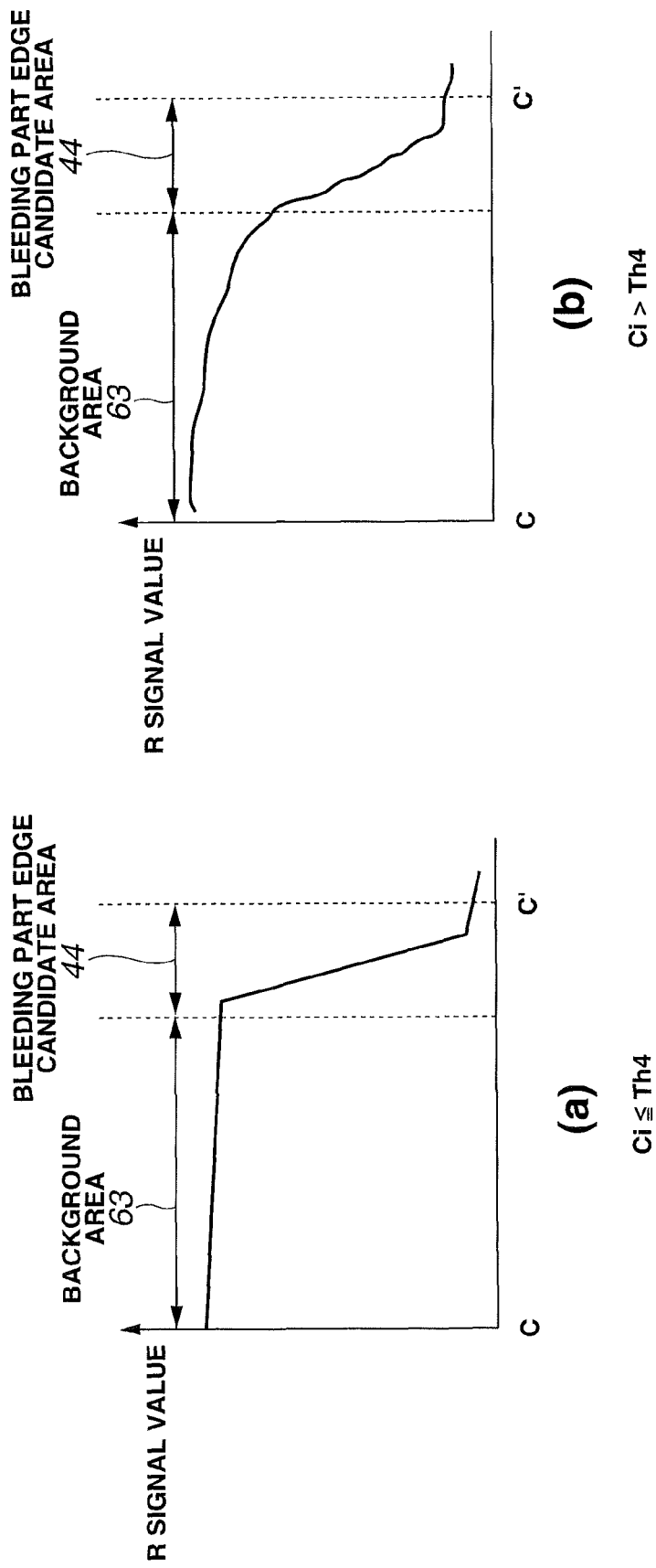
FIG. 14 schematically shows the values of R signals of pixels positioned on the C-C' line in FIG. 13.

FIG. 14 is a schematic diagram illustrating bleeding part edge determination with the use of the continuity evaluation feature quantity $C_i$. FIG. 14 schematically shows the values of R signals of pixels positioned on the C-C' line in FIG. 13.

FIGS. 14(a) and 14(b) show change in the value of the R signal in the case where the bleeding part edge candidate area 44 is a bleeding part edge and change in the value of the R signal in the case where the bleeding part edge candidate area 44 is an edge formed by an element other than bleeding, respectively.

As shown in FIG. 14(a), in the case where the bleeding part edge candidate area 44 is a bleeding part edge, the value of the R signal is almost constant in the background area 63, while the value of the R signal largely changes in the bleeding part edge candidate area 44.

On the other hand, as shown in FIG. 14(b), in the case where the bleeding part edge candidate area 44 is an edge formed by an element other than bleeding, the value of the R signal gradually changes from the background area 63 to the bleeding part edge candidate area 44.

By grasping the difference between the changes in the value of the R signal from the background area 63 to the bleeding part edge candidate area 44 as the continuity evaluation feature quantity $C_i$, it is possible to determine whether or not an bleeding part edge candidate area is a bleeding part edge with the use of the continuity evaluation feature quantity $C_i$.

At step S211, the CPU 21 determines whether or not the edge determination has been performed for all the bleeding part edge candidate areas 44. Specifically, if i<M is satisfied, then the CPU 21 adds 1 to the number i identifying the bleeding part edge candidate area 44 (i=i+1) at step S212 and returns to step S204 to perform the bleeding part edge determination for the remaining the bleeding part edge candidate areas 44. On the other hand, if i=M is satisfied, then the CPU 21 terminates the processing in FIG. 12.

As described above, in the image processing apparatus 1 of this embodiment, it is possible to relatively determine and detect whether or not a bleeding part edge candidate area is a bleeding part edge by using an edge feature quantity which is the amount of change in color signals in a bleeding part edge.

In this embodiment, an edge feature quantity is also calculated for peripheral areas around a bleeding part edge, and whether or not a bleeding part edge candidate area is a bleeding part edge is determined by evaluating the continuity of the edge feature quantity from the peripheral areas to the bleeding part edge. Thereby, it is possible to prevent such shape change as has an edge feature quantity similar to that of a bleeding part edge or intestinal fluid from being wrongly detected as a bleeding part edge. Thus, according to the present invention, the precision of detection of a bleeding part edge is further improved.

Instead of the edge feature quantity, the color edge feature quantity described in the second embodiment may be used to extract bleeding part edge candidate areas 44.

Specifically, the CPU 21 performs processing similar to the bleeding part edge extraction processing described with the use of FIG. 9 in the second embodiment, instead of performing the processing for extracting bleeding part edge candidate areas 44 at step S202 in FIG. 12 (that is, the bleeding part edge candidate extraction processing described with the use of FIG. 4 in the first embodiment). In this case, the areas extracted as bleeding part edges in the second embodiment are the bleeding part edge candidate areas 44 in this embodiment.

(Fourth Embodiment)

Next, a fourth embodiment of the present invention will be described. In the third embodiment described above, an edge feature quantity is also calculated for peripheral areas around a bleeding part edge candidate area, and whether or not a bleeding part edge candidate area is a bleeding part edge is determined by evaluating the continuity of the edge feature quantity from the peripheral areas to the bleeding part edge candidate area. In this embodiment, however, whether or not a bleeding part edge candidate area is a bleeding part edge is determined based on the fluid surface color tone of the internal area of the bleeding part edge candidate area.

The entire configuration of the image processing apparatus 1 is the same as that in the third embodiment except that the content of processing performed by an image processing program 71 is different. Therefore, only characteristic operations will be described here. The same components will be given the same reference numerals, and description thereof will be omitted.

Figure 15:
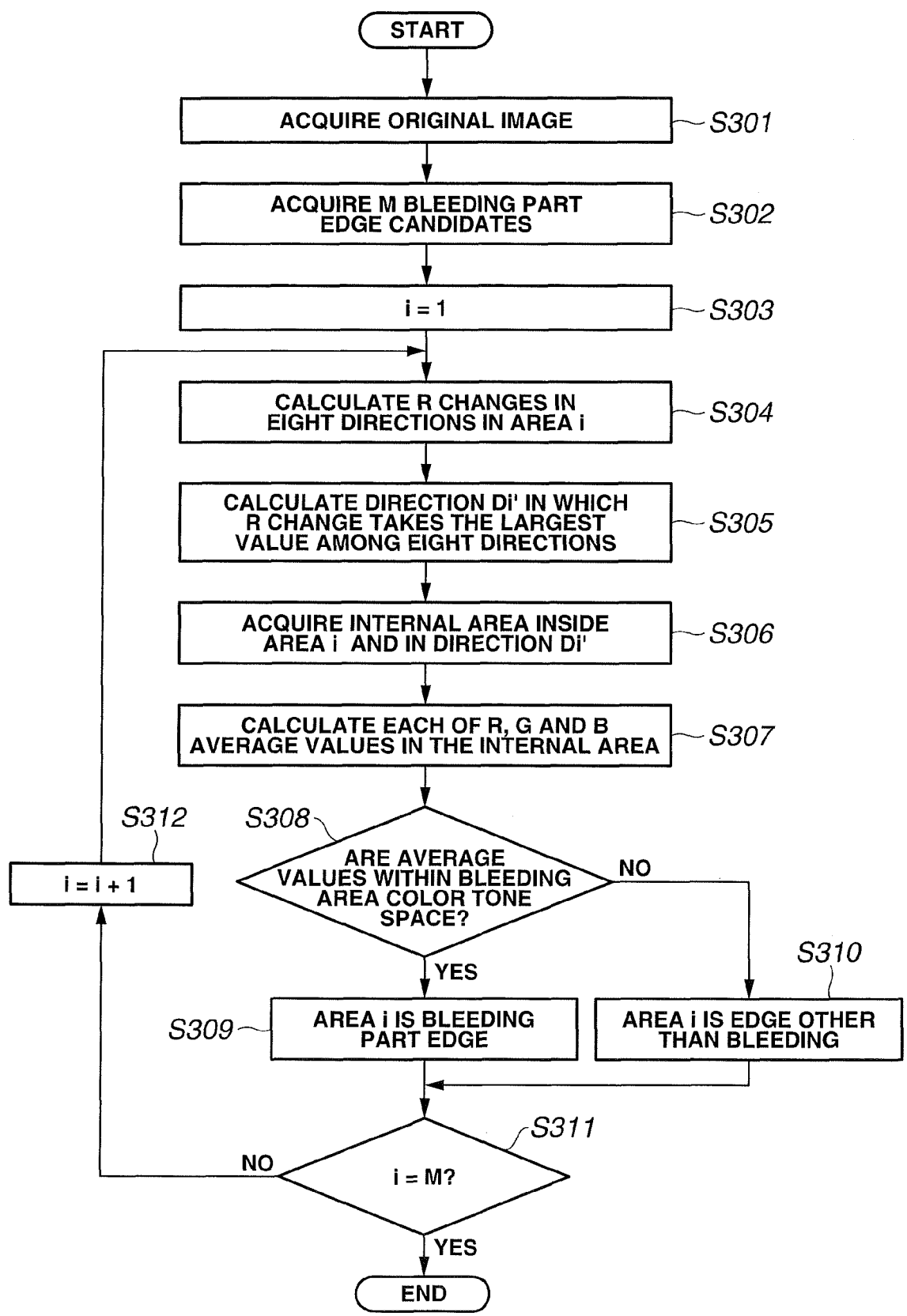
FIG. 15 is a flowchart illustrating the procedure for image analysis processing by an image processing program in a fourth embodiment of the present invention.

In this embodiment, processing for detecting, for example, a bleeding part edge will be described with the use of the flowchart in FIG. 15, similarly to the third embodiment. FIG. 15 is a flowchart illustrating the procedure for image analysis processing by an image processing program 71.

First, at step S301, the CPU 21 acquires image data specified by the operation device 12 from the image filing apparatus 4 and stores it in the memory 22 as an original image 31. At the next step S302, the CPU 21 generates N×N divided areas 43 from the original image 31 acquired at step S301 and extracts bleeding part edge candidate areas 44.

At the next step S303, the CPU 21 initializes i which indicates the number identifying the bleeding part edge candidate area 44 to be analyzed, to 1. The number i identifying the bleeding part edge candidate area 44 is an integer value equal to or above 1 and equal to or below M. Here, M is the number of the divided areas 43 extracted as the bleeding part edge candidate areas 44 at step S302.

At the subsequent step S304, the CPU 21 calculates the first to eighth R changes in the i-th bleeding part edge candidate area 44. The processings at steps S301 to S304 are similar to the processings at steps S201 to S204 in FIG. 12, respectively.

At the next step S305, the CPU 21 sets the direction in which the R change is the largest among the first to eighth R changes calculated at step S304, as a candidate area feature quantity $D_i'$. For example, if the fourth R change is the largest, then the candidate area feature quantity $D_i'$ is the diagonally lower-right direction as shown in FIG. 7(d).

Figure 16:
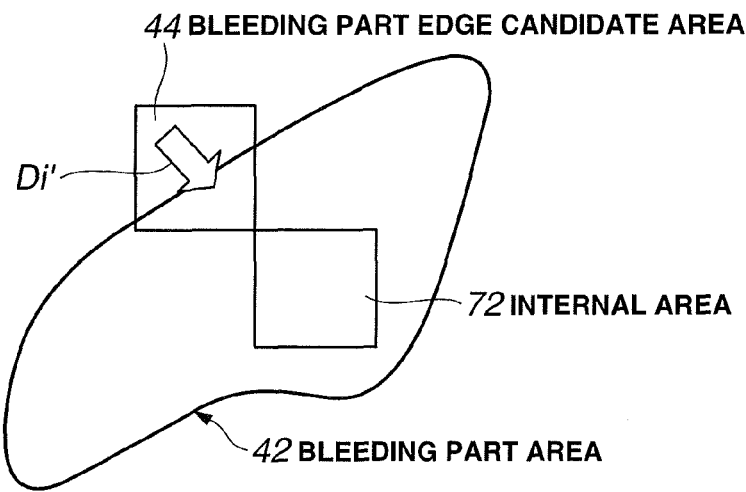
FIG. 16 is a schematic diagram illustrating the relation between a bleeding part edge candidate area and an internal area.

At the subsequent step S306, the CPU 21 sets an internal area 72 related to the i-th bleeding part edge candidate area 44 as shown in FIG. 16. FIG. 16 is a schematic diagram illustrating the relation between the bleeding part edge candidate area 44 and the internal area 72.

The internal area 72 is an area for evaluating the fluid surface color tone inside an edge, and it is positioned to be adjacent to the i-th bleeding part edge candidate area 44 in the direction of the candidate area feature quantity $D_i'$ determined at step S305 when seen from the center of the i-th bleeding part edge candidate area 44. Furthermore, the internal area 72 has the same shape and area as the bleeding part edge candidate area 44.

Next, at step S307, the CPU 21 acquires the values of R signals, G signals and B signals of the pixels included in the internal area 72 and calculates average values $Ra_i'$, $Ga_i'$ and $Ba_i'$ of the respective color signals in the internal area 72. At the subsequent step S308, the CPU 21 compares a bleeding part area color tone space set in advance and the average values $Ra_i'$, $Ga_i'$ and $Ba_i'$ of the respective color signals calculated at step S307.

The processings at steps S307 and S308 are similar to the processings at steps S13 and S14 in FIG. 3, respectively. If the average values $Ra_i'$, $Ga_i'$ and $Ba_i'$ of the respective color signals calculated at step S307 exist within the bleeding part area color tone space, the CPU 21 determines at step S309 that the i-th bleeding part edge candidate area 44 is a bleeding part edge and proceeds to processing at step S311.

On the other hand, if the average values $Ra_i'$, $Ga_i'$ and $Ba_i'$ of the respective color signals calculated at step S307 do not exist within the bleeding part area color tone space, then the CPU 21 determines at step S310 that the i-th bleeding part edge candidate area 44 is not a bleeding part edge and proceeds to processing at step S311.

The G/R and B/G color tone space may be used to make determination on a bleeding part edge. That is, if (G/R)min≦$Ga_i/Ra_i$≦(G/R)max and (B/G)min≦$Ba_i/Ga_i$≦(B/G)max are satisfied, then the CPU 21 determines that the i-th divided area 43 is a bleeding part edge candidate.

At step S311, the CPU 21 determines whether or not the edge determination has been performed for all the bleeding part edge candidate areas 44. Specifically, if i<M is satisfied, then the CPU 21 adds 1 to the number i identifying the bleeding part edge candidate area 44 at step S311 and returns to step S304 to perform the bleeding part edge determination for the remaining bleeding part edge candidate areas 44. On the other hand, if i=M is satisfied, then the CPU 21 terminates the processing in FIG. 15.

As described above, in the image processing apparatus 1 of this embodiment, it is possible to relatively determine and detect whether or not a bleeding part edge candidate area is a bleeding part edge by using an edge feature quantity which is the amount of change in color signals in a bleeding part edge.

In this embodiment, whether or not a bleeding part edge candidate area is a bleeding part edge is determined by evaluating the fluid surface color tone in the internal area of a bleeding part edge. Thereby, it is possible to prevent such a foreign matter as has a change of an edge feature quantity similar to that of a bleeding part edge, from the peripheral mucous membrane to a bleeding part or intestinal fluid from being wrongly detected as a bleeding part edge. Thus, according to the present embodiment, the precision of detection of a bleeding part edge is further improved.

In this embodiment also, the color edge feature quantity described in the second embodiment may be used to extract bleeding part edge candidate areas 44, instead of the edge feature quantity, similarly to the third embodiment.

In the above four embodiments, the case of extracting a bleeding part edge given has been described as an example. However, the present invention is not limited to the embodiments described above, and various changes and alterations can be made within the range where the spirit of the present invention is not changed. For example, the present invention is applicable to the case of extracting the outline part of a reddened part on the surface of mucous membrane.

(Fifth Embodiment)

Next, a fifth embodiment of the present invention will be described below with reference to FIG. 1 and FIGS. 17 to 25.

The object of this embodiment is to provide an image processing apparatus, an image processing method and an image processing program capable of relatively determining whether or not an area is a hemorrhage edge with the use of the amount of change in color signals on the outline part of a hemorrhage area (hereinafter referred to as a hemorrhage edge) and detecting a hemorrhage area surrounded by the hemorrhage edge.

As examples of the hemorrhage area, a bleeding part where bleeding from mucous membrane actually occurs, a reddened part where the surface of mucous membrane is reddened by hyperemia, and the like are given, as described in the first embodiment.

In this embodiment, the case of detecting, for example, a bleeding part will be described. The network configuration formed by the image processing apparatus 1 according to the fifth embodiment of the present invention and its related systems is the same configuration as in FIG. 1.

As shown in FIG. 1, the image processing apparatus 1 which performs various image processings and information processings is connected to the LAN 2 which uses TCP/IP as its communication protocol. Meanwhile, the endoscope observation apparatus 3 which captures an image of the inside of a living body and outputs an image signal is also connected to the LAN 2 via the endoscope filing apparatus 4.

The endoscope filing apparatus 4 receives an image signal from the endoscope observation apparatus 3, generates image data and accumulates the generated image data. That is, the image processing apparatus 1 acquires the image data accumulated in the endoscope filing apparatus 4 via the LAN 2.

Figure 17:
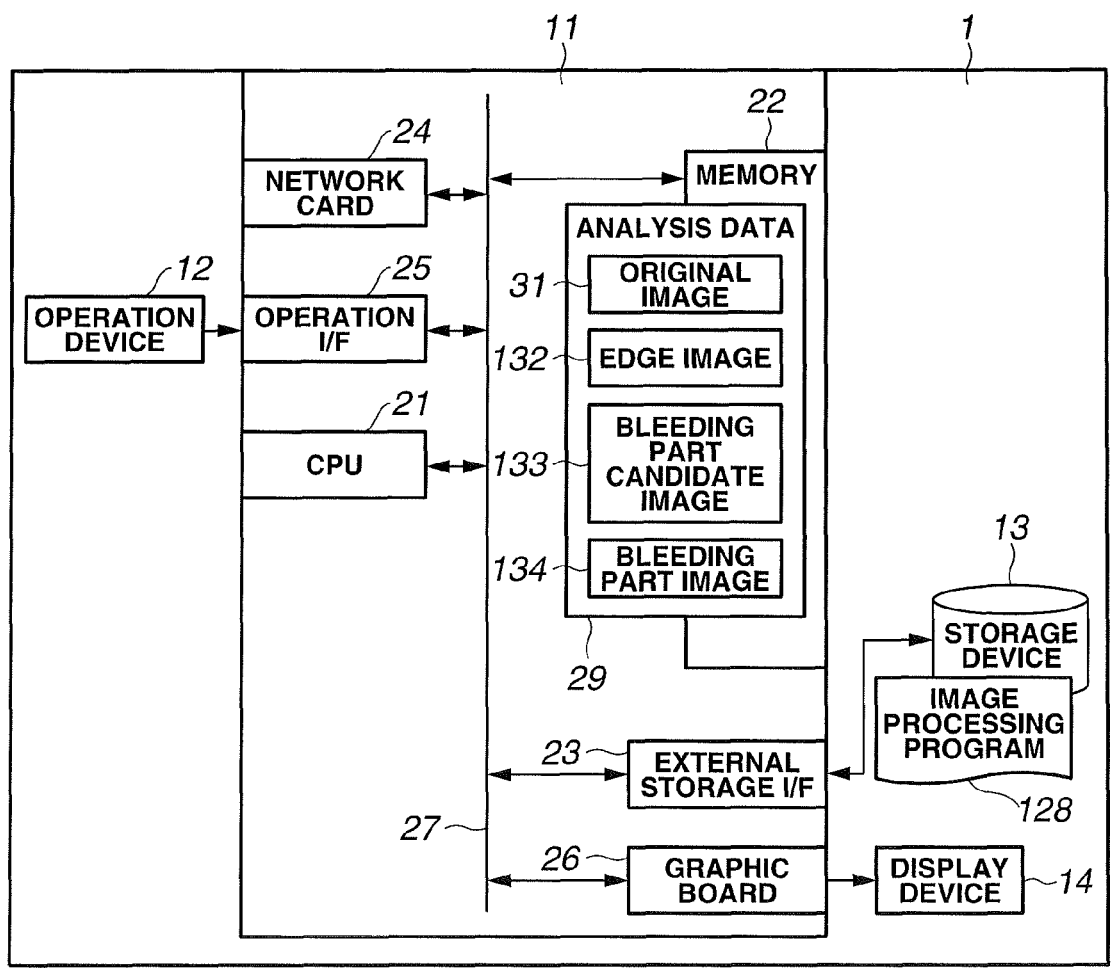
FIG. 17 is a diagram schematically showing the entire configuration of an image processing apparatus of a fifth embodiment.

The image processing apparatus 1 of this embodiment is configured as shown in FIG. 17. The hardware configuration of this image processing apparatus 1 is the same as that of the image processing apparatus 1 in FIG. 2. Therefore, the same components as in FIG. 2 are given the same reference numerals. In the image processing apparatus 1 of this embodiment, an image processing program 128 different from the image processing program 28 in FIG. 2 is adopted. Furthermore, in this embodiment, images different from the analysis data 29 stored in the memory 22 in FIG. 2 are stored as the analysis data 29 stored in the memory 22.

As shown in FIG. 17, the image processing apparatus 1 of this embodiment is configured with the general-purpose personal computer 11 as its center and provided with the operation device 12 configured by a keyboard and a mouse, the storage device 13 configured by a hard disk and the display device 14 configured by a CRT.

Each of the operation device 12, the storage device 13 and the display device 14 is electrically connected to the personal computer 11. Specification of image data to be processed, acquisition and display of the specified image data and instruction to execute processing are inputted from the operation device 12. The result of various processings performed by the image processing apparatus 1 is displayed on the display device 14.

The personal computer 11 has the CPU 21 which performs execution and control of various programs, the memory 22 which stores the various processing programs and data, the external storage I/F 23 which performs reading and writing of information to and from the storage device 13, the network card 24 which communicates information with external equipment, the operation I/F 25 which receives an operation signal inputted from the operation device 12 and performs necessary data processing and the graphic board 26 which outputs a video signal to the display device 14, and each of them is electrically connected to the bus 27. Therefore, these components in the personal computer 11 can mutually send and receive information via the bus 27.

The network card 24 is electrically connected to the LAN 2 and sends and receives information to and from the endoscope filing apparatus 4 which is also connected to the LAN 2.

The external storage I/F 23 reads an image processing program 128 stored in the storage device 13 and stores it in the memory 22. The image processing program 128 is a program which executes image analysis processing and configured by multiple execution files, dynamic link library files or setting files.

By the image processing program 128 which is stored in the memory 22 being executed, the CPU 21 operates. The CPU 21 performs image analysis processing for image data acquired from the endoscope filing apparatus 4. Analysis data 29 acquired or generated by each processing by the CPU 21 is stored in the memory 22.

This analysis data 29 includes an original image 31 which is the image data acquired from the endoscope filing apparatus 4. Furthermore, the analysis data 29 includes an edge image 132 generated by various processings to be described later, a bleeding part candidate image 133 and a bleeding part image 134.

In this case, the CPU 21 has an evaluation area setting processing function of dividing the original image 31 into multiple small areas, extracting areas including the outline part of a hemorrhage area based on color signals in each of the small areas, and setting the extracted small areas as hemorrhage evaluation areas.

When performing the evaluation area setting processing, the CPU 21 sets multiple small areas in the vicinity of or around the hemorrhage evaluation area as evaluation target areas. The CPU 21 has a hemorrhage candidate area determination processing function of calculating the amount of change of color signals in the multiple evaluation target areas, extracting hemorrhage edge candidate areas based on the amount of change, and determining whether or not the hemorrhage evaluation area is a hemorrhage candidate area based on the ratio of the set evaluation target areas to the extracted hemorrhage edge candidate areas.

This CPU 21 also has a hemorrhage area determination processing function of determining whether or not a hemorrhage candidate area is a hemorrhage area based on the amount of change of two or more color signals in the hemorrhage edge candidate area.

The operation of the image processing apparatus 1 configured as described above will be described. In this embodiment, the case of detecting, for example, a bleeding part area will be described with the use of the flowchart in FIG. 18.

Figure 18:
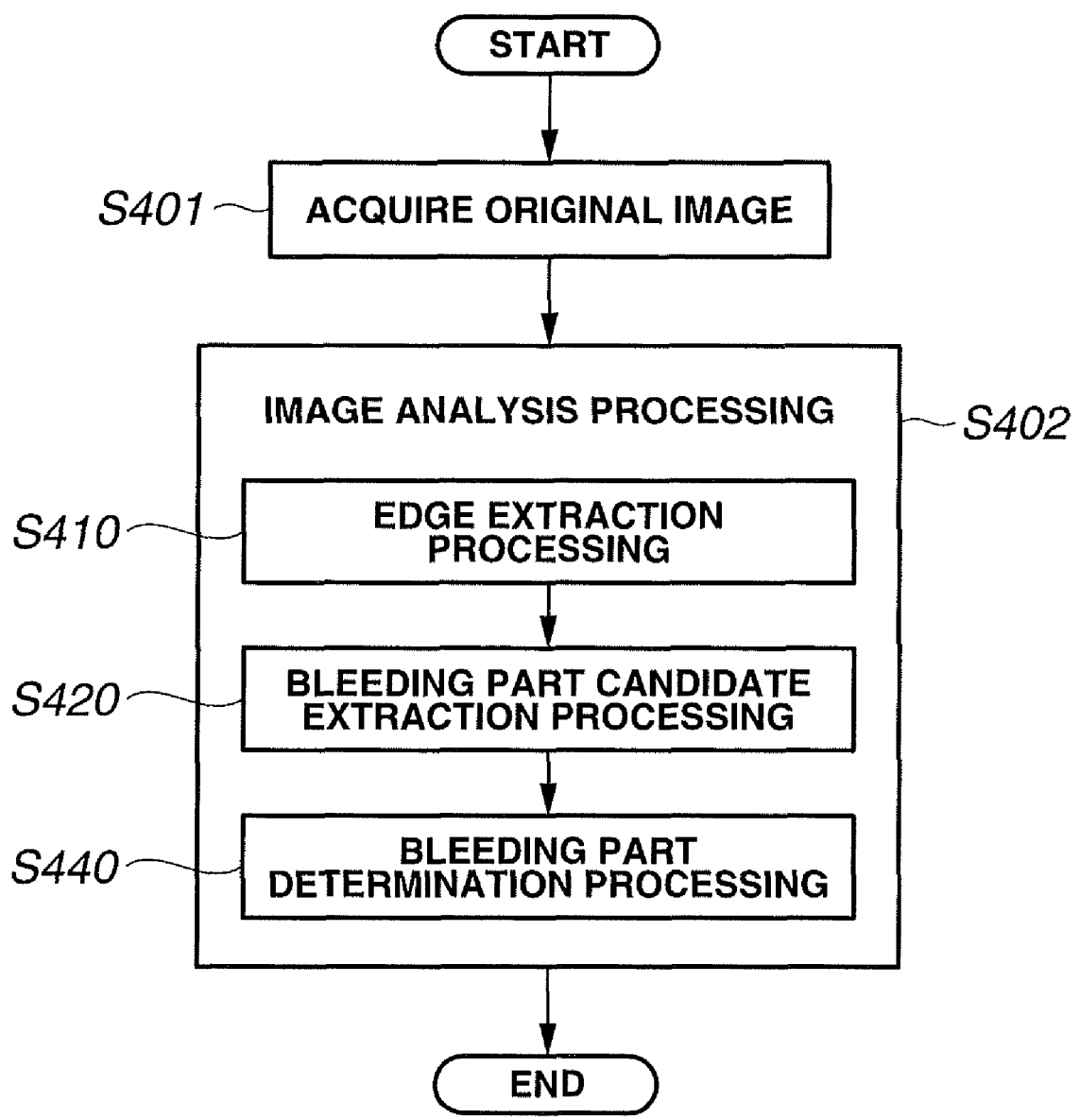
FIG. 18 is a flowchart illustrating the procedure for image analysis processing by an image processing program.

FIG. 18 is a flowchart illustrating the procedure for image analysis processing by an image processing program 128. First, at step S401, which is an original image acquisition step, the CPU 21 acquires image data specified by the operation device 12 from the image filing apparatus 4 and stores it in the memory 22 as an original image 31.

The original image 31 is a color image constituted by three planes of red (R), green (G) and blue (B). The tone number of a pixel of each plane takes an 8-bit value, that is, a value between 0 and 255. Next, at step S402, which is an image analysis processing step, the CPU 21 performs various processings for the original image 31 acquired at step S401 to generate a bleeding part candidate image 133, an edge image 132 and a bleeding part image 134.

This image analysis processing step (step S402) is constituted by edge extraction processing (step S410) for generating the edge image 132 from the original image 31, bleeding part candidate extraction processing (step S420) for generating the bleeding part candidate image 133 from the original image 31 and bleeding part determination processing (step S440) for generating the bleeding part image 134 from the edge image 132 and the bleeding part candidate image 133, and the processings are executed in that order. Each of the above processings in the image analysis processing step (step S402) will be described in accordance with the processing order.

Figure 19:
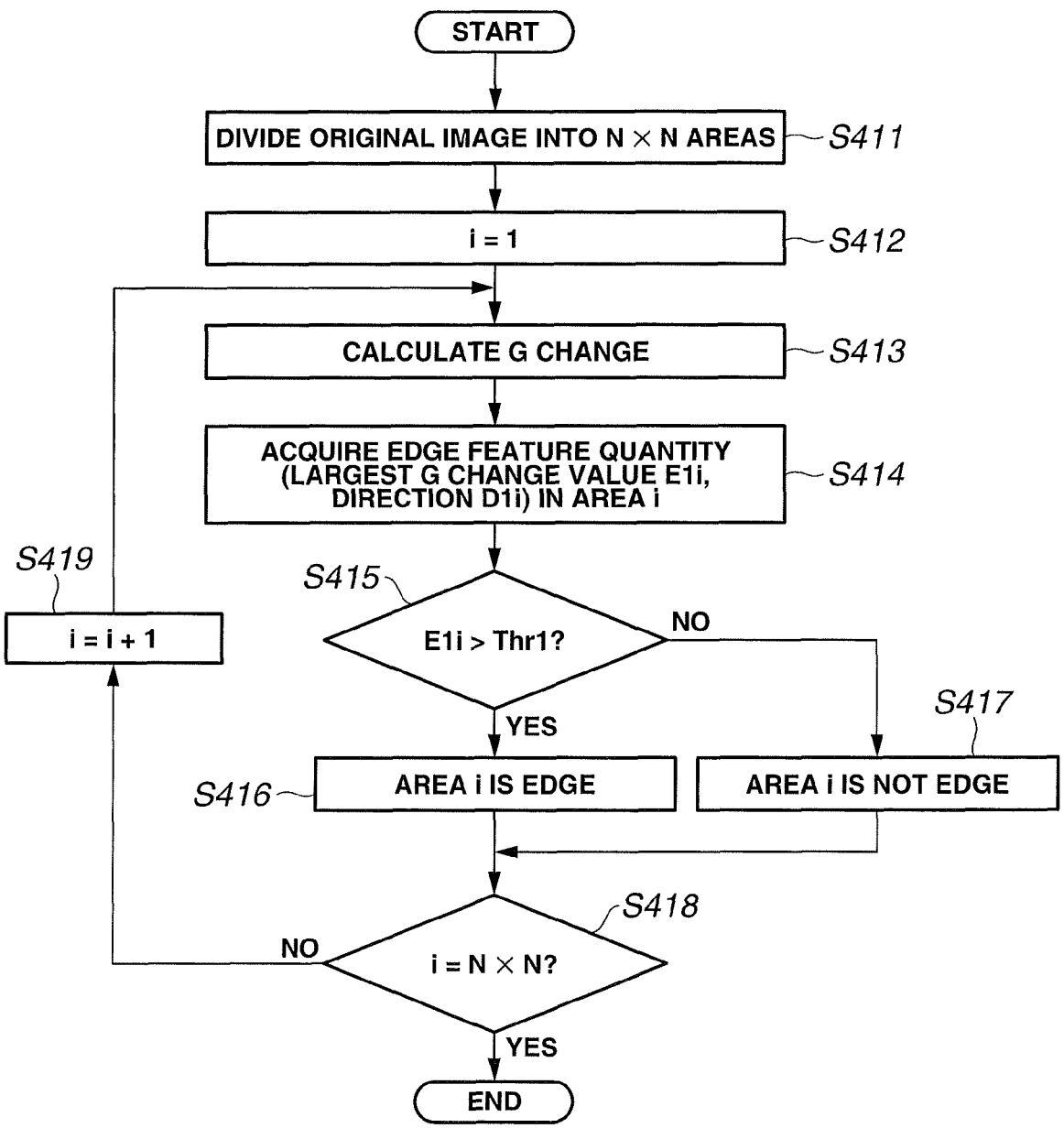
FIG. 19 is a flowchart illustrating the procedure for edge extraction processing.

First, the edge extraction processing will be described with the use of FIG. 19. FIG. 19 is a flowchart illustrating the procedure for the edge extraction processing.

First, at step S411, the CPU 21 divides the original image 31 into N×N small areas. In the embodiment of the present invention, for example, N=36 is set. Reverse gamma correction or shading correction for the original image 31 may be added as preprocessing before step S411. In this case, the corrected image for which the correction processing has been performed is divided into small areas, and subsequent processings are performed therefor.

Next, at step S412, the CPU 21 initializes i which indicates the number identifying the divided small area (hereinafter referred to as a divided area) to be analyzed, to 1. The number i identifying the divided area 141 takes an integer value equal to or above 1 and equal to or below N×N.

Next, at step S413, the CPU 21 calculates change in the value of the G signal (hereinafter referred to as G change) in the i-th divided area 141. The G change is calculated from the value of the G signal (G1) of a particular pixel in the divided area 141 and the value of the G signal (G2) of a different, particular pixel in the same divided area 43. Specifically, the CPU 21 performs calculation with the formula of G change=$\log_e$(G2)−$\log_e$(G1).

In this embodiment, the CPU 21 calculates the G change for each of eight directions, that is, upward and downward directions, right and left directions and diagonal directions in the divided area 141, as shown in FIG. 20. FIGS. 20(a) to 20(h) are diagrams illustrating a method for calculating the G changes.

First G change is upward G change as shown in FIG. 20(a), and it is calculated with the value of the G signal of the pixel at the lower center as G1 and the value of the G signal of the pixel at the upper center as G2. Second G change is G change toward the diagonally upper-right direction as shown in FIG. 20(b), and it is calculated with the value of the G signal of the pixel at the lower left as G1 and the value of the G signal of the pixel at the upper right as G2. Third G change is the right-direction G change as shown in FIG. 20(c), and it is calculated with the value of the G signal of the pixel at the left center as G1 and the value of the G signal of the pixel at the right center as G2.

Fourth G change is G change toward the diagonally lower-right direction as shown in FIG. 20(d), and it is calculated with the value of the G signal of the pixel at the upper left as G1 and the value of the G signal of the pixel at the lower right as G2. Fifth G change is the downward G change as shown in FIG. 20(e), and it is calculated with the value of the G signal of the pixel at the upper center as G1 and the value of the G signal of the pixel at the lower center as G2. Sixth G change is the G change toward the diagonally lower-left direction as shown in FIG. 20(f), and it is calculated with the value of the G signal of the pixel at the upper right as G1 and the value of the G signal of the pixel at the lower left as G2.

Seventh G change is G change toward the left direction as shown in FIG. 20(g), and it is calculated with the value of the G signal of the pixel at the right center as G1 and the value of the G signal of the pixel at the left center as G2. Eighth G change is G change toward the diagonally upper-left direction as shown in FIG. 20(h), and it is calculated with the value of the G signal of the pixel at the lower right as G1 and the value of the G signal of the pixel at the upper left as G2.

Next, at step S414, setting the largest value among the first to eighth G changes calculated at step S413 as $E1_i$, the CPU 21 calculates the direction in which the G change is the largest, as $D1_i$. For example, if the fourth G change is the largest, then the direction $D1_i$ is the diagonally lower-right direction as shown in FIG. 20(d). The two feature quantities, that is, the largest value of the G change $E1_i$ and the direction $D1_i$ are collectively referred to as an edge feature quantity.

Next, at step S415, the CPU 21 determines whether or not the i-th divided area 141 is an edge. Specifically, if the largest value of the G change $E1_i$>Thr1 is satisfied, then the CPU 21 determines that the i-th divided area 141 is an edge. Here, Thr1 is a threshold, and, for example, Thr1=0.3 is set in the embodiment of the present invention.

If $E1_i$>Thr1 is satisfied, then the CPU 21 determines at step S416 that the i-th divided area 141 is an edge and proceeds to step S418. If $E1_i \leq Thr1$ is satisfied, then the CPU 21 determines at step S417 that the i-th divided area 141 is not an edge and proceeds to step S418.

At step S418, the CPU 21 determines whether or not the edge determination has been performed for all the divided areas 141. Specifically, if i<N×N is satisfied, then the CPU 21 adds 1 to the number i identifying the divided area 141 (i=i+1) at step S419 and returns to step S413 to perform the edge determination for the remaining divided areas 141. If i=N×N is satisfied, then the CPU 21 terminates the processing in FIG. 19 and proceeds to the subsequent bleeding part candidate extraction processing.

Figure 21:
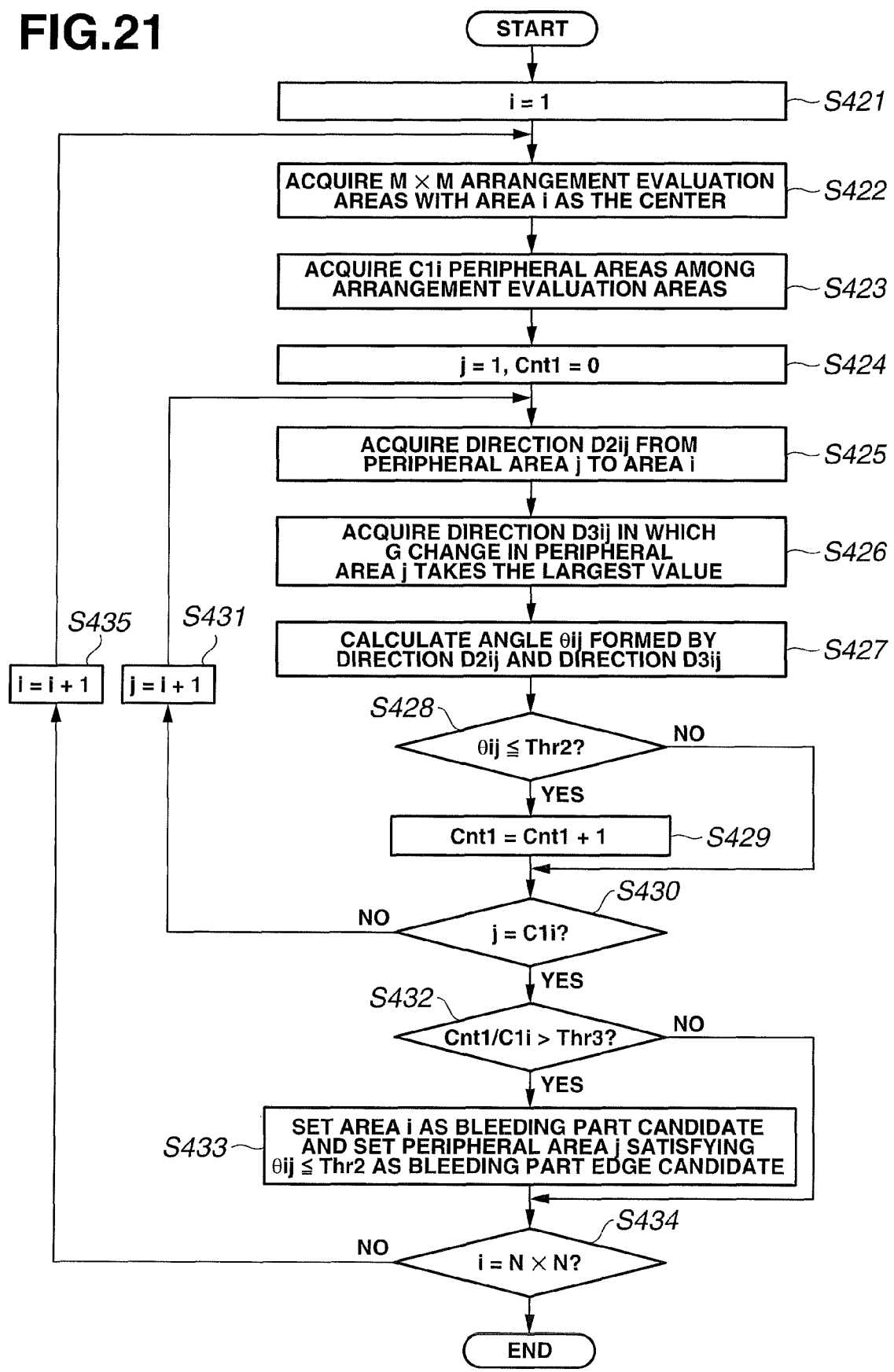
FIG. 21 is a flowchart illustrating the procedure for bleeding part candidate extraction processing.

Next, the bleeding part candidate extraction processing will be described with the use of FIG. 21. FIG. 21 is a flowchart illustrating the procedure for the bleeding part candidate extraction processing. In the bleeding part candidate extraction processing, the CPU 21 extracts bleeding part candidates and bleeding part edge candidates based on the arrangement of the edge extracted by the edge extraction processing.

First, the CPU 21 executes the processings at steps S421 to S423 as evaluation area setting means, and sets peripheral areas 143 as evaluation target areas, for the i-th divided area 141 as a hemorrhage evaluation area.

Here, the peripheral areas 143 are set on a closed curve surrounding the periphery of the i-th divided area 141. At step S421, the CPU 21 initializes i which indicates the number identifying the divided area 141 to be analyzed, to 1. The number i identifying the divided area 141 takes an integer value equal to or above 1 and equal to or below N×N.

Next, at step S422 as shown in FIG. 22(a), the CPU 21 acquires M×M divided areas 141 with the i-th divided area 141 as the center, as arrangement evaluation areas 142 for the i-th divided area 141.

FIG. 22 is a diagram illustrating the bleeding part candidate extraction processing. In this embodiment, the CPU 21 sets M=5, for example. Subsequently, at step S423, the CPU 21 acquires divided areas 141 which are in contact with the outline of the arrangement evaluation areas 142 acquired at step S422, as the peripheral areas 143 (shaded areas).

In this embodiment, the number $C1_i$ of the peripheral areas 143 related to the i-th divided area 141 is sixteen as shown in FIG. 22(a).

Next, the CPU 21 executes processings at steps S424 to 5432 as hemorrhage candidate area determination means. First, at step S424, the CPU 21 initializes j which indicates the number identifying the peripheral area 143 to be analyzed and a counter Cnt1 for counting the number of bleeding part edge candidate areas among the peripheral areas 143, to 1 and 0, respectively.

The number j which identifies the peripheral area 143 and the counter Cnt1 take an integer value equal to or above 1 and equal to or below $C1_i$. Subsequently, at step S425, the CPU 21 sets the direction from j-th peripheral area 143 toward the i-th divided area 141 as $D2_{ij}$. Next, at step S26, the CPU 21 calculates G changes in eight directions in the j-th peripheral area 43 and sets the direction in which the G change is the largest as $D3_{ij}$. The method for calculating the G changes at step S426 is similar to the method for calculating the G changes at step S413.

Subsequently, at step S427, the CPU 21 determines an angle $\theta_{ij}$ formed by the direction $D2_{ij}$ acquired at step S425 and the direction $D3_{ij}$ acquired at step S426 (see FIG. 22(b)). Next, at step S428, the CPU 21 determines whether or not the j-th peripheral area 143 is a bleeding part edge candidate. Specifically, for the angle $\theta_{ij}$ calculated at step S427, the CPU 21 determines whether or not $\theta_{ij} \leq Thr2$ is satisfied. Here, Thr2 is a threshold, and, for example, Thr2=45 (degrees) is set in the embodiment of the present invention. The bleeding part edge candidate determination at step S428 is tentative (interim) determination. The result of the determination at this step is not adopted until it is determined by the processing to be described later that the i-th divided area 141 is a bleeding part candidate area.

If $\theta_{ij} \leq Thr2$ is satisfied, then the CPU 21 determines that the j-th peripheral area 143 is a bleeding part edge candidate, adds 1 to Cnt1 at step S429 and proceeds to step S430. If of $\theta_{ij} > Thr2$ is satisfied, then the CPU 21 determines at step S428 that the j-th peripheral area 143 is not a bleeding part edge candidate and proceeds to step S430.

At step S430, the CPU 21 determines whether or not the bleeding part edge candidate determination has been performed for all the peripheral areas 143 related to the i-th divided area 141. Specifically, if j<$C1_i$ is satisfied, then the CPU 21 adds 1 to the number j identifying the peripheral area 143 (j=j+1) at step S431 and returns to step S425 to perform the bleeding part edge candidate determination for the remaining peripheral areas 143. If j=$C1_i$ is satisfied, then the CPU 21 proceeds to step S432.

At step S432, the CPU 21 determines whether or not the i-th divided area 41 is a bleeding part candidate. Specifically, the ratio of Cnt1 which is the number of the bleeding part edge candidate areas to $C1_i$ which is the number of the peripheral areas 143 is calculated, and it is determined whether Cnt1/$C1_i$>Thr3 is satisfied. Here, Thr3 is a threshold, and, for example, Thr3=0.7 is set in the embodiment of the present invention.

Figure 23:
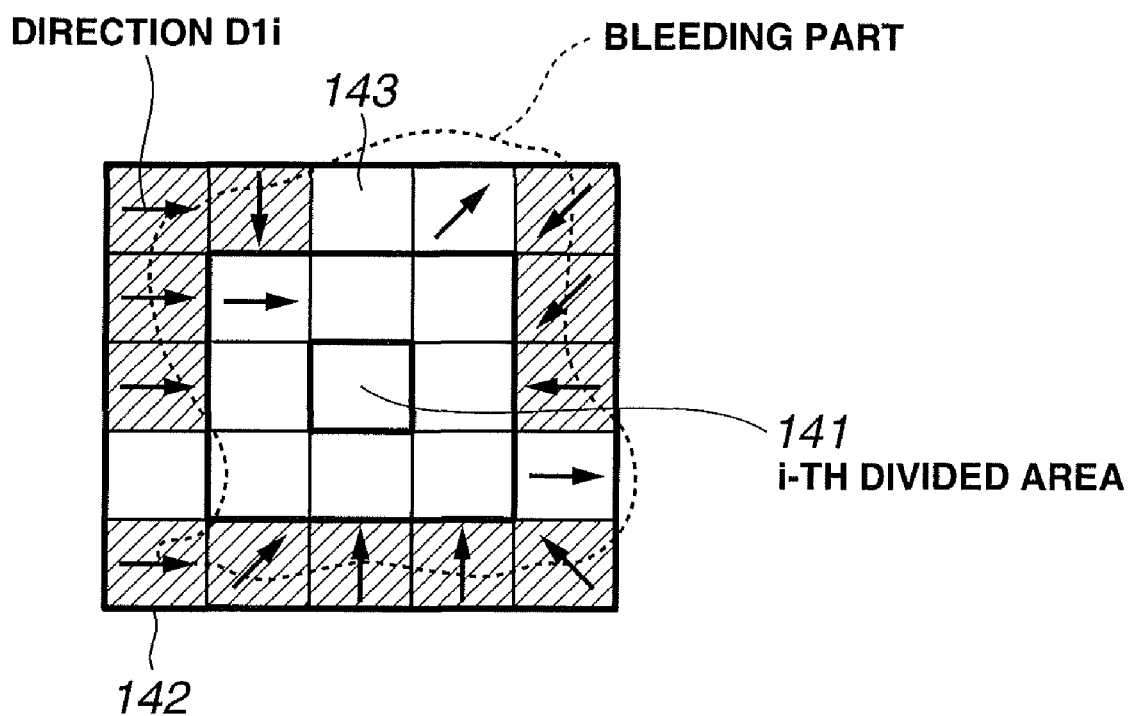
FIG. 23 is a diagram illustrating a method for determining bleeding part candidates.

As shown in FIG. 23, if Cnt1/$C1_i$>Thr3 is satisfied, then the CPU 21 determines at step S433 that the i-th divided area 141 is a bleeding part candidate. At step S428, the CPU 21 formally determines that the peripheral areas 143 tentatively determined to be bleeding part edge candidates, that is, peripheral areas 143 which are related to the i-th divided area 141 and satisfy $\theta \leq Thr2$ are bleeding part edge candidates. FIG. 23 is a diagram illustrating a method for determining bleeding part candidates.

In FIG. 23, for example, among sixteen peripheral areas 143 related to the i-th divided area 141, fourteen peripheral areas 143 where the direction $D1_i$, which is the edge feature quantity, is shown as an arrow are determined to be edges. Furthermore, since twelve among the fourteen peripheral areas determined to be edges satisfy $\theta_{ij} \leq Thr2$, the result of Cnt1/$C1_i$ is 0.75.

Since the value of Cnt1/$C1_i$ is above 0.7, which is set as Thr3, the i-th divided area 141 is determined to be a bleeding part candidate, and the twelve peripheral areas 143 satisfying $\theta_{ij} \leq Thr2$ are determined to be bleeding part edge candidates. (The meshed peripheral areas 143 in FIG. 23 are the areas determined to be bleeding part edge candidates.)

When step S433 ends, the CPU 21 proceeds to step S434. If Cnt1/$C1_i \leq Thr3$ is satisfied, then the CPU 21 determines that the i-th divided area 141 is not a bleeding part candidate and proceeds to step S434.

At step S434, the CPU 21 determines whether or not the bleeding part candidate determination has been performed for all the divided areas 141. Specifically, if i<N×N is satisfied, then the CPU 21 adds 1 to the number i identifying the divided area 141 (i=i+1) at step S435 and returns to step S422 to perform the bleeding part candidate determination for the remaining divided areas 141. If i=N×N is satisfied, the CPU 21 terminates the processing in FIG. 21 and proceeds to the subsequent bleeding part determination processing.

Figure 24:
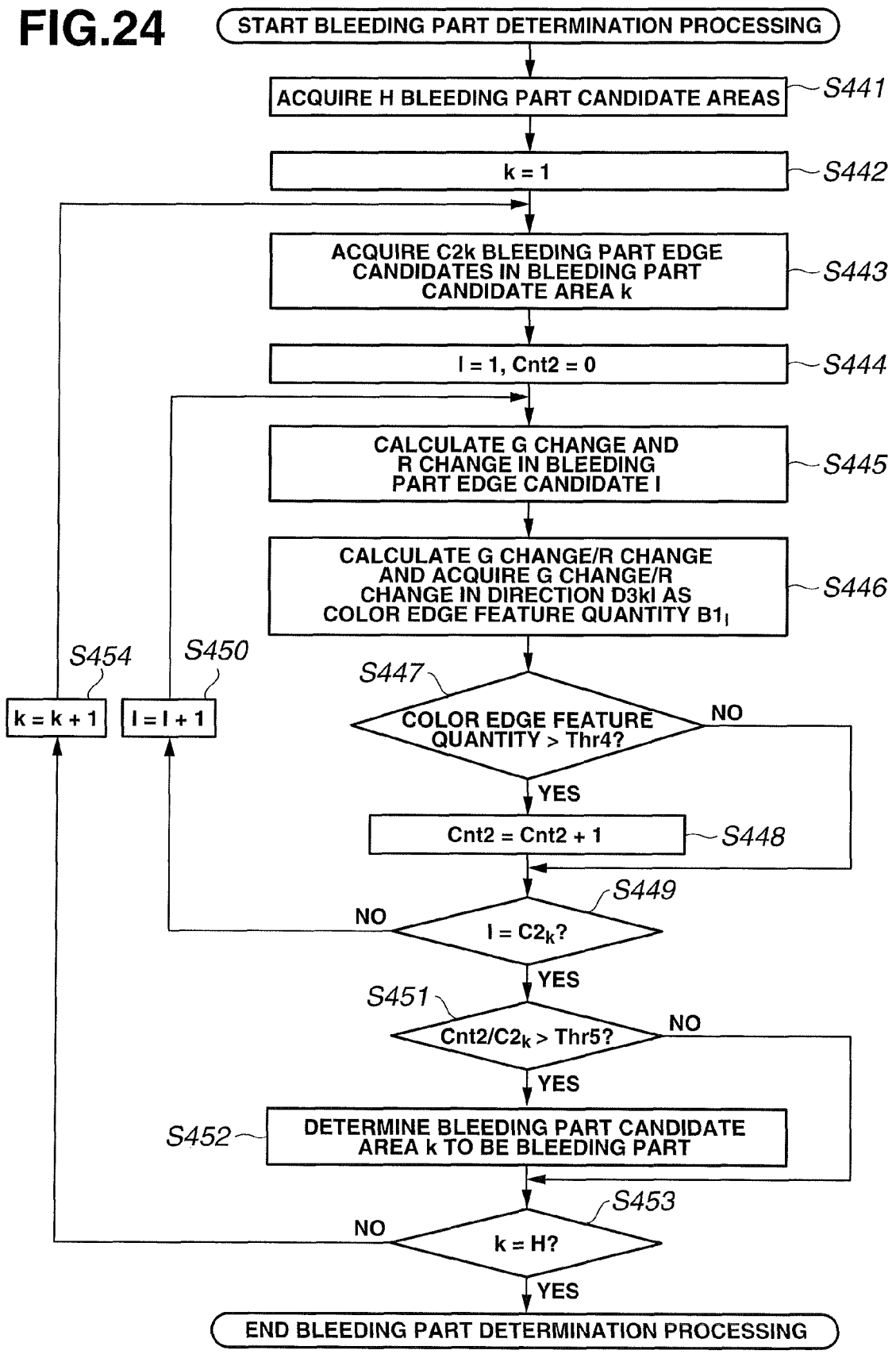
FIG. 24 is a flowchart illustrating the procedure for bleeding part determination processing.

Next, the bleeding part determination processing as hemorrhage area determination means will be described with the use of FIG. 24. FIG. 24 is a flowchart illustrating the procedure for the bleeding part determination processing. In the bleeding part determination processing, for each of the peripheral areas 143 around the bleeding part edge candidate extracted by the bleeding part candidate extraction processing, the CPU 21 calculates a color edge feature quantity based on the ratio of changes of two or more color signals among the R signal, the G signal and the B signal, and determines whether or not the peripheral area is a bleeding part edge based on the color edge feature quantity. Furthermore, the CPU 21 determines a bleeding part area based on the extracted bleeding part edge areas.

First, at step S441, the CPU 21 acquires the divided areas 141 determined to be bleeding part candidates by the bleeding part candidate extraction processing. The number of the divided areas 141 which are bleeding part candidates is denoted by H. Next, at step S442, the CPU 21 initializes k which indicates the number identifying the divided area 141 to be analyzed, to 1. The divided areas 141 to be analyzed are the H divided areas 141 which are the bleeding part candidates acquired at step S441. Therefore, the number k identifying the divided area 141 takes an integer value equal to or above 1 and equal to or below H.

Subsequently, at step S443, the CPU 21 acquires the peripheral areas 143 determined to be bleeding part edge candidates around the k-th divided area 141 in the bleeding part candidate extraction processing. The number of the peripheral areas 143 which are bleeding part edge candidates is denoted by $C2_k$. Next, at step S444, the CPU 21 initializes l which indicates the number identifying the peripheral area 143 to be analyzed and a counter Cnt2 for counting the number of bleeding part edge areas among the peripheral areas 143, to 1 and 0, respectively. The number l which identifies the peripheral area 143 and the counter Cnt2 take an integer value equal to or above 1 and equal to or below $C2_k$.

Next, at step S445, the CPU 21 calculates change in the value of the R signal (hereinafter referred to as R change) and change in the value of the G signal (hereinafter referred to as G change) in the l-th peripheral area 143. The R change is calculated from the value of the R signal (R1) of a particular pixel P1 in the peripheral area 143 and the value of the R signal (R2) of a different particular pixel P2 in the same peripheral area 143. Specifically, it is calculated with the formula of R change=$\log_e(R2)-\log_e(R1)$.

The G change is calculated from the value of the G signal of the pixel P1 (G1) and the value of the G signal of the pixel P2 (G2) which are used when the R change is calculated. Specifically, it is calculated with the formula of G change=$\log_e(G2)-\log_e(G1)$. In this embodiment, the R change and the G change are calculated for each of eight directions, that is, upward and downward directions, right and left directions and diagonal directions in the peripheral area 143, as shown in FIG. 25.

FIGS. 25(a) to 25(h) are diagrams illustrating a method for calculating R changes and G changes. Since the method for calculating the first to eighth G changes shown in FIGS. 25(a) to 25(h) is similar to the method for calculating the first to eighth G changes shown in FIGS. 20(a) to 20(h) calculated at step S413, detailed description thereof will be omitted.

In the method for calculating the first to eighth R changes shown in FIGS. 25(a) to 25(h), the same pixels used in calculation of the first to eighth G changes are used, and the method is similar to the method for calculating the first to eighth G changes if G1 and G2, the values of the G signal, are substituted with R1 and R2, the values of the R signal, respectively. Therefore, detailed description thereof will be omitted.

Next, at step S446, the CPU 21 determines the first to eighth change ratios by dividing the first to eighth G changes by the first to eighth R changes, respectively. Furthermore, the CPU 21 sets the value of the ratio of the G change to the R change in the direction $D3_{kl}$ in which the G change becomes the largest in the l-th peripheral area 143 and which has been calculated at step S426, as a color edge feature quantity $B1_l$.

In the vicinity of a boundary area between peripheral mucous membrane and a bleeding part, that is, in the vicinity of a bleeding part edge, change in the G signal is generally larger than change in the R signal or the B signal. Therefore, the largest value of G change/R change is assumed to be the color edge feature quantity. The largest value of G change/B change may be used as the color edge feature quantity.

Next, at step S447, the CPU 21 determines whether or not the l-th peripheral area 143 is a bleeding part edge. Specifically, if the color edge feature quantity $B1_l$>Thr4 is satisfied, then the CPU 21 determines that the l-th peripheral area 143 is a bleeding part edge. The bleeding part edge determination at step S447 is tentative determination. The result of the determination at this step is not adopted until it is determined by the processing to be described later that the k-th divided area 141 is a bleeding part area.

Here, Thr4 is a threshold, and, for example, Thr4=1.0 is set in the embodiment of the present invention. If $B1_l$>Thr4 is satisfied, then the CPU 21 determines that the l-th peripheral area 143 is a bleeding part edge, adds 1 to Cnt2 at step S448 and proceeds to step S449.

If $B1_l \leq$Thr4 is satisfied, then the CPU 21 determines that the l-th peripheral area 143 is not a bleeding part edge and proceeds to step S449.

At step S449, the CPU 21 determines whether or not the bleeding part edge determination has been performed for all the peripheral areas 143 related to the k-th divided area 141. Specifically, if $1<C2_k$ is satisfied, then the CPU 21 adds 1 to the number l identifying the peripheral area 143 (l=l+1) at step S450 and returns to step S445 to perform the bleeding part edge determination for the remaining peripheral areas 143.

If $j=C2_k$ is satisfied, then the CPU 21 terminates the bleeding part edge determination processing and proceeds to step S451.

At step S451, the CPU 21 determines whether or not the k-th divided area 141 is a bleeding part. Specifically, the CPU 21 calculates the ratio of Cnt2 which is the number of the bleeding part edge areas to $C2_k$ which is the number of the peripheral areas 143 and determines whether Cnt2/$C2_k$>Thr5 is satisfied.

Here, Thr5 is a threshold, and, for example, Thr5=0.7 is set in the embodiment of the present invention. If Cnt2/$C2_k$>Th5 is satisfied, then the CPU 21 determines at step S452 that the k-th divided area 141 is a bleeding part.

At step S447, the CPU 21 formally determines that the peripheral areas 143 tentatively determined to be bleeding part edges, that is, peripheral areas 143 which are related to the k-th divided area 141 and satisfy $B1_l$>Th4 are bleeding part edges.

When step S452 ends, the CPU 21 proceeds to step S453. If Cnt2/$C2_k \leq$Th5 is satisfied, then the CPU 21 determines that the k-th divided area 141 is not a bleeding part and proceeds to step S453.

At step S453, the CPU 21 determines whether or not the bleeding part determination has been performed for all the divided areas 141 that are bleeding part candidates. Specifically, if k<H is satisfied, then the CPU 21 adds 1 to the number k identifying the divided area 141 at step S454 (k=k+1) and returns to step S443 to perform the bleeding part determination for the remaining divided areas 141 which are bleeding part candidates. If k=H is satisfied, then the CPU 21 terminates the processing.

As described above, in the image processing apparatus 1 of this embodiment, bleeding part candidates are extracted based on the arrangement of bleeding part edge candidates; it is relatively determined whether or not a bleeding part edge candidate is a bleeding part edge based on the ratio of the amount of change in different color signals (color edge feature quantity) in the bleeding part edge candidate; and an area surrounded by the bleeding part edge is detected as a bleeding part. Thereby, a bleeding part with a small area can be detected with a high precision.

(Sixth Embodiment)

Next, a sixth embodiment of the present invention will be described. In the fifth embodiment described above, divided areas 141 which are in contact with the outline of arrangement evaluation areas 142 are assumed to be peripheral areas 143. In this embodiment, peripheral areas 143 are also provided within the arrangement evaluation areas 142 so that the range of the hemorrhage edge candidate evaluation target area is widened. Thereby, it is possible to detect bleeding parts in more various shapes.

The entire configuration of the image processing apparatus 1 is the same as that of the fifth embodiment except that the content of the processing performed by an image processing program 81 is different from that of the image processing program 128 in the fifth embodiment. Therefore, only characteristic operations will be described here. The same components will be given the same reference numerals, and description thereof will be omitted. In this embodiment, the case of detecting, for example, a bleeding part will be described, similarly to the fifth embodiment.

The image analysis processing in this embodiment is the same as that of the fifth embodiment except that steps S423 to S431 of the bleeding part candidate extraction processing, that is, the content of the bleeding part edge candidate determination processing is different. The bleeding part edge candidate determination processing in this embodiment will be described with the use of the flowchart in FIG. 26.

Figure 26:
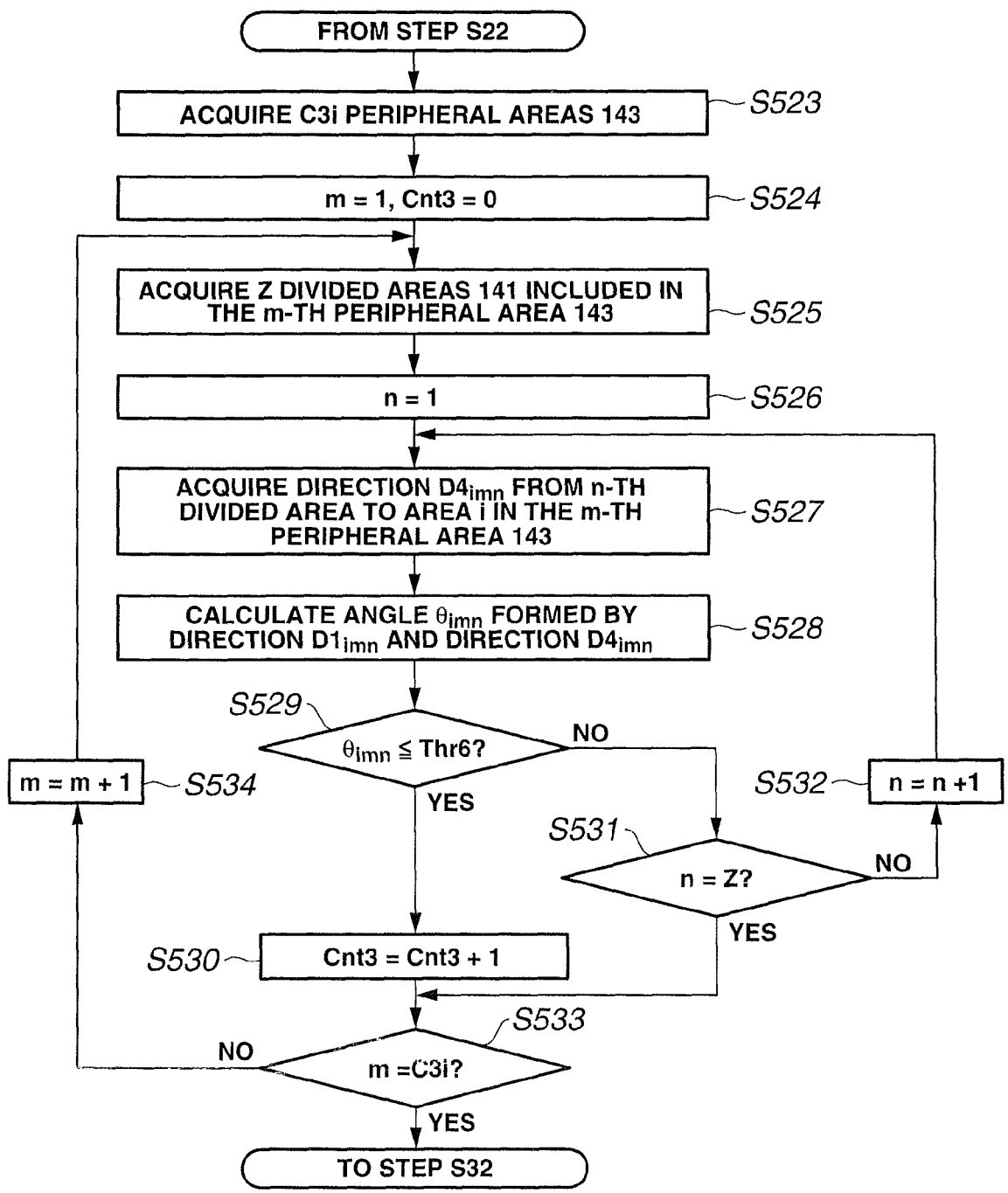
FIG. 26 is a flowchart illustrating the procedure for bleeding part edge candidate determination processing in the second embodiment.

FIG. 26 is a flowchart illustrating the procedure for the bleeding part edge candidate determination processing in the sixth embodiment.

At step S401 in FIG. 18, the CPU 21 acquires an original image 31, and acquires arrangement evaluation areas 142 for the i-th divided area 141 through steps S421 to S422 in FIG. 21 after finishing the edge extraction processing at step S410. Then, the bleeding part edge candidate determination processing shown in FIG. 26 is executed.

Figure 27:
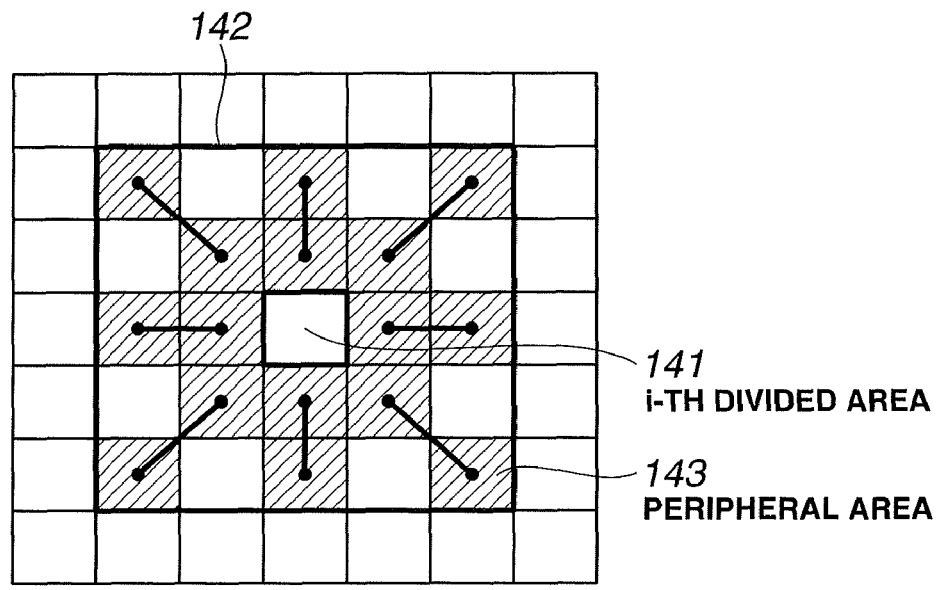
FIG. 27 is a diagram illustrating positions where peripheral areas are set in the fifth embodiment.

In the bleeding part edge candidate determination processing, first at step S523, the CPU 21 sets the number of divided areas 141 within z areas from the outline part as $C3_i$ which is the number of the peripheral areas 143, within the arrangement evaluation areas 142 acquired at step S22. In this embodiment, for example, divided areas 141 corresponding to 5×5=25 are acquired as the arrangement evaluation areas 142, and as for Z corresponding to the width of the peripheral areas 143, Z=2 is set. In this case, $C3_i$, the number of the peripheral areas 143 is eight, as shown in FIG. 27. FIG. 12 is a diagram illustrating the positions where the peripheral areas 143 are set in the second embodiment.

Next, at step S524, the CPU 21 initializes m which indicates the number identifying the peripheral area 143 to be analyzed and a counter Cnt3 for counting the number of bleeding part edge candidate areas in the peripheral areas 143, to 1 and 0, respectively.

The number m which identifies the peripheral area 143 and the counter Cnt3 take an integer value equal to or above 1 and equal to or below $C3_i$. Subsequently, at step S525, the CPU 21 acquires divided areas 141 included in the m-th peripheral area 143.

Specifically, half lines are drawn from the i-th divided area 141 positioned in the center of the arrangement evaluation areas 142 to the outline of the arrangement evaluation areas 142 through Z divided areas 141 positioned inside the outline of the arrangement evaluation areas 142, and divided areas 141 positioned on the half lines are acquired as the peripheral areas 143 (see FIG. 27).

In this embodiment, since Z=2 is set, the number of divided areas 141 included in one peripheral area 143 is two. That is, in FIG. 27, two divided areas 141 connected via a line segment belong to the same peripheral area 143.

Subsequently, at step S526, the CPU 21 initializes n which indicates the number identifying the divided areas 141 in the m-th peripheral area 143, to 1. The number n identifying the divided area 141 takes an integer value equal to or above 1 and equal to or below Z.

Next, at step S527, the CPU 21 sets the direction from n-th divided area 141 in the m-th peripheral area 143 to the i-th divided area 141 as $D4_{imn}$. Subsequently, at step S528, the CPU 21 determines an angle $\theta_{imn}$ formed by the direction $D1_{imn}$ of the edge feature quantity of the n-th divided area 141 in the m-th peripheral area 143, which has been acquired at step S14, and the direction $D4_{imn}$ acquired at step S527.

Subsequently, at step S529, the CPU 21 determines whether or not the m-th peripheral area 143 is a bleeding part edge candidate. Specifically, as for the angle $\theta_{imn}$ calculated at step S528, the CPU 21 determines whether or not $\theta_{imn} \leq$ Thr6 is satisfied.

Here, Thr6 is a threshold, and, for example, Thr6=45 (degrees) is set in the embodiment of the present invention. Similarly to step S428 in the fifth embodiment, the bleeding part edge candidate determination at step S529 is tentative determination. The result of the determination at this step is not adopted until it is determined by the processing to be described later that the i-th divided area 141 is a bleeding part candidate area. If $\theta_{imn} \leq$ Thr6 is satisfied, then the CPU 21 determines that the m-th peripheral area 143 is a bleeding part edge candidate, adds 1 to Cnt3 at step S530 and proceeds to step S533.

If $\theta_{imn} >$ Thr6 is satisfied, then at step S531, the CPU 21 determines whether or not the bleeding part edge candidate determination has been performed for all the divided areas 141 included in the m-th peripheral area 143. Specifically, if n<Z is satisfied, then the CPU 21 adds 1 to the number n identifying the divided area 141 in the m-th peripheral area 143 (n=n+1) at step S532 and returns to step S527 to perform the bleeding part edge candidate determination for the remaining divided areas 141.

If n=Z is satisfied, then the CPU 21 determines that the m-th peripheral area 143 is not a bleeding part edge candidate and proceeds to step S533. That is, if there is any area that satisfies $\theta_{imn} \leq$ Th6, which is the condition for determination of a bleeding part edge candidate, among the Z divided areas 141 included in the m-th peripheral area, then the CPU 21 determines that the m-th peripheral area is a bleeding part edge candidate.

At step S533, the CPU 21 determines whether or not the bleeding part edge candidate determination has been performed for all the peripheral areas 143 related to the i-th divided area 141. Specifically, if m<$C3_i$ is satisfied, then the CPU 21 adds 1 to the number m identifying the peripheral area 143 (m=m+1) at step S534 and returns to step S525 to perform the bleeding part edge candidate determination for the remaining peripheral areas 143.

If m=C3$_i$ is satisfied, then the CPU 21 terminates the processing and proceeds to step S32. Since the processings after step S32 are similar to those in the fifth embodiment, description thereof will be omitted.

Figure 28:
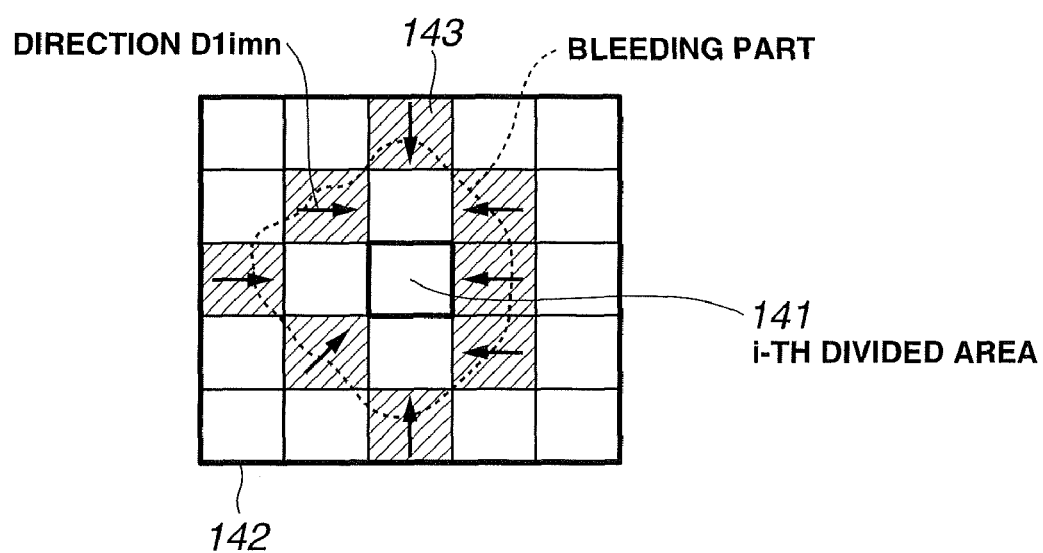
FIG. 28 is a diagram illustrating bleeding part candidate determination processing in the fifth embodiment.

When the bleeding part candidate determination processing ends at step S34, bleeding part candidates are extracted as shown in FIG. 28, for example. FIG. 28 is a diagram illustrating the bleeding part candidate determination processing. In FIG. 28, for example, it is determined that, among eight peripheral areas 143 related to the i-th divided area 141, eight peripheral areas 143 in which the direction D1$_{imn}$, which is the edge feature quantity, is shown as an arrow in a divided area 141 are edges.

Furthermore, since all the eight peripheral areas 143 which have been determined to be edges satisfy $\theta_{imn} \leq$ Thr6, the result of Cnt3/C3$_i$ becomes 1. Since the value of Cnt3/C3$_i$ is above 0.7 set as Thr3, the i-th divided area 141 is determined to be a bleeding part candidate, and the eight peripheral areas 143 satisfying O$_{imn} \leq$ Thr6 are determined to be bleeding part edge candidates.

In the bleeding part determination processing for the bleeding part candidates extracted as described above, bleeding part determination is performed based on the color edge feature quantity of the bleeding part edge candidates, similarly to the fifth embodiment.

As described above, in the image processing apparatus 1 of this embodiment, since the range of the peripheral areas 143 to be evaluated as a bleeding part edge candidate is widened, it is possible to detect a bleeding part in various forms such as an oval and an amoeba shape in addition to small bleeding parts, and the precision of detecting a bleeding part is further improved.

(Seventh Embodiment)

Next, a seventh embodiment of the present invention will be described. In the fifth embodiment described above, divided areas 141 in contact with the entire circumference of the outline of arrangement evaluation areas 142 are assumed to be peripheral areas 143. In this embodiment, divided areas 141 arranged on opposed two sides of the outline of the arrangement evaluation areas 142 and on opposed two lines with a diagonal line between them are assumed to be peripheral areas 143.

Thereby, even when a bleeding part is belt-shaped and only a part of the bleeding part is shown in an endoscope image, it is possible to detect the bleeding part according to this embodiment.

The entire configuration of the image processing apparatus 1 is the same as that of the fifth embodiment except that the content of the processing performed by an image processing program 91 is different from that of the image processing program 128 in the fifth embodiment. Therefore, only characteristic operations will be described here. The same components will be given the same reference numerals, and description thereof will be omitted. In this embodiment, the case of detecting, for example, a bleeding part will be described, similarly to the fifth embodiment.

The image analysis processing in this embodiment is the same as that of the fifth embodiment except that the positions of peripheral areas 143 set at step S423 in the bleeding part candidate extraction processing are different, and that there are provided multiple patterns of arrangement of peripheral areas 143 set for one divided area 141 as shown in FIGS. 29(a) to 29(d).

That is, at step S423, the CPU 21 acquires divided areas 141 which are in contact with vertically opposed two sides of the outline of the arrangement evaluation areas 142 acquired at step S422, as peripheral areas 143, as shown in FIG. 29(a), and performs the bleeding part edge candidate determination and bleeding part candidate determination processings through steps S424 to 5433.

When step S433 ends, the CPU 21 returns to step S423, and it acquires divided areas 141 which are in contact with horizontally opposed two sides of the outline of the arrangement evaluation areas 142, as peripheral areas 143, as shown in FIG. 29(b), and performs the bleeding part edge candidate determination and bleeding part candidate determination processings.

Similarly, the CPU 21 performs the bleeding part edge candidate determination and bleeding part candidate determination processings for the pattern in which divided areas 141 positioned on two lines with a diagonal line from the upper left toward the lower right between them are set as peripheral areas 143 as shown in FIG. 29(c), and the pattern in which divided areas 141 positioned on two lines with a diagonal line from the upper right toward the lower left between them are set as peripheral areas 143 as shown in FIG. 29(d).

After performing the bleeding part edge candidate determination and bleeding part candidate determination processings for all the arrangement patterns for peripheral areas 143, the CPU 21 proceeds to step S434 and performs the processing at and after the step S434.

In the bleeding part determination processing for the bleeding part candidates extracted as described above, bleeding part determination is performed based on the color edge feature quantity of the bleeding part edge candidates, similarly to the fifth embodiment.

As described above, in the image processing apparatus 1 of this embodiment, divided areas 141 which are arranged on opposed two lines with a divided area 141 to be evaluated as a bleeding part candidate between them are used as peripheral areas 143 to be evaluated as a bleeding part edge candidate. Thereby, even when a bleeding part is belt-shaped and only a part of the bleeding part is shown in an endoscope image, the bleeding part can be detected, and the precision of detecting a bleeding part is further improved.

In the above fifth to seventh three embodiments, description has been made on the case of extracting a bleeding part as a hemorrhage area as an example. However, the present invention is not limited to the above embodiments, and various changes and alterations can be made within the scope where the spirit of the present invention is not changed. For example, the present invention is also applicable to the case of extracting a reddened part on the surface of mucous membrane.

Industrial Applicability

An endoscope image captured of a mucosa of a living body by an endoscope and the like is image processed, and multiple pieces of color information thereof are used to objectively detect a hemorrhage area, whereby assisting a doctor in making medical diagnosis.

The invention claimed is:

1. An image processing apparatus comprising:
a hemorrhage edge candidate area extraction section for extracting a candidate area for the outline part of a hemorrhage area, based on an image signal of a medical image constituted by multiple color signals obtained by capturing an image of a living body;
a feature quantity calculation section for calculating a feature quantity of the hemorrhage area based on calculation of a value of the amount of change in the image signal in a small area including the candidate area, among multiple small areas obtained by dividing the medical image, the value of the amount of change indicating that a luminance value of at least one of the color signals in the small area changes most largely; and a hemorrhage edge determination section for determining whether or not the candidate area is a hemorrhage edge as the outline part of the hemorrhage area, the hemorrhage edge determination section comprising a shape edge determination section for determining whether or not the candidate area is a shape edge as an outline part of a mucous membrane shape area based on the feature quantity, and an edge determination section for determining whether or not the candidate area is the outline part of the hemorrhage area by excluding the shape edge.

2. The image processing apparatus according to claim 1, wherein
the hemorrhage edge candidate area extraction section comprises a determination section for determining whether or not each of average values of the multiple color signals constituting the image signal in the multiple small areas obtained by dividing the medical image exists within a predetermined range or whether or not the value of the ratio of two color signals is within a predetermined range, and the candidate area for the outline part of the hemorrhage area is extracted based on the result by the determination section.

3. The image processing apparatus according to claim 1, wherein
the hemorrhage edge determination section further comprises an adjacent area feature quantity calculation section for calculating the feature quantity in an adjacent area adjacent to the candidate area, and it is determined whether or not the candidate area is the outline part of the hemorrhage area based on the ratio of the feature quantity of the candidate area to the feature quantity of the adjacent area.

4. The image processing apparatus according to claim 1, wherein
the hemorrhage edge determination section determines whether or not the candidate area is the outline part of the hemorrhage area based on the image signal in the adjacent area adjacent to the candidate area.

5. An image processing method comprising:
a hemorrhage edge candidate area extraction step of extracting a candidate area for the outline part of a hemorrhage area, based on an image signal of a medical image constituted by multiple color signals obtained by capturing an image of a living body;
a feature quantity calculation step of calculating a feature quantity of the hemorrhage area based on calculation of a value of the amount of change in the image signal in a small area including the candidate area, among multiple small areas obtained by dividing the medical image. the value of the amount of change indicating that a luminance value of at least one of the color signals in the small area changes most largely; and
a hemorrhage edge determination step comprising a shape edge determination step for determining whether or not the candidate area is a shape edge as an outline part of a mucous membrane shape area based on the feature quantity, the hemorrhage edge determination step determining whether or not the candidate area is a hemorrhage edge as the outline part of the hemorrhage area by excluding the shape edge determined by the shape edge determination step.

6. The image processing method according to claim 5, wherein
the hemorrhage edge candidate area extraction step comprises
a determination step of determining whether or not each of average values of the multiple color signals constituting the image signal in the multiple small areas obtained by dividing the medical image exists within a predetermined range or whether or not the value of the ratio of two color signals is within a predetermined range, and the candidate area for the outline part of the hemorrhage area is extracted based on the result by the determination step.

7. The image processing method according to claim 5, wherein at least a color signal of G is used for the two color signals used in the calculation of the amount of change.

8. The image processing method according to claim 5, wherein the hemorrhage edge determination step performs the determination of the outline part of the hemorrhage area with the use of a size threshold for determining the outline part of the hemorrhage area.

9. The image processing method according to claim 5, wherein
the hemorrhage edge determination step determines whether or not the extracted candidate area is the outline part of the hemorrhage area, based on peripheral area information calculated in peripheral areas of the extracted candidate area.

10. The image processing method according to claim 5, wherein the hemorrhage edge determination step determines whether or not the candidate area is the outline part of the hemorrhage area, based on the result of evaluation of continuity between the peripheral area feature quantity calculated in a peripheral area of the extracted candidate area and the feature quantity calculated in the candidate area.

11. The image processing method according to claim 5, wherein the hemorrhage edge determination step determines whether or not the extracted candidate area is the outline part of the hemorrhage area, based on the result of evaluation of the color tone in an internal area calculated inside the extracted candidate area.

12. The image processing method according to claim 5, wherein the hemorrhage edge includes the edge of a reddened part.

13. A computer readable medium storing a program of instructions executable by a machine to perform a method of image processing, said program causing a computer to execute:
a hemorrhage edge candidate area extraction procedure for extracting a candidate area for the outline part of a hemorrhage area, based on an image signal of a medical image constituted by multiple color signals obtained by capturing an image of a living body;
a feature quantity calculation procedure for calculating a feature quantity of the hemorrhage area based on calculation of a value of the amount of change in the image signal in a small area including the candidate area, among multiple small areas obtained by dividing the medical image, the value of the amount of change indicating that a luminance value of at least one of the color signals in the small area changes most largely; and
a hemorrhage edge determination procedure comprising a shape edge determination procedure for determining whether or not the candidate area is a shape edge as an outline part of a mucous membrane shape area based on the feature quantity, the hemorrhage edge e determination procedure determining whether or not the candidate area is the outline part of the hemorrhage area by excluding the shape edge determined by the shape edge determination procedure.

14. The image processing apparatus according to claim 1, wherein
the shape edge determination section determines that the candidate area is a shape edge when the number of candidate areas for the hemorrhage edge included in a large area composed of a plurality of the candidate areas for the hemorrhage edge connected in any of eight directions of upward and downward directions, right and left directions and diagonal directions is equal to or larger than a predetermined value.

15. The image processing apparatus according to claim 1, wherein
the feature quantity calculation section calculates the feature quantity of the hemorrhage area based on values of the amount of changes indicating that luminance values of two or more of the color signals in the small area change most largely.

16. The image processing apparatus according to claim 1, wherein
the feature quantity calculation section calculates the feature quantity in peripheral area of the candidate area for the outline part of the hemorrhage area, and
the hemorrhage edge determination section determines whether or not the candidate area is the hemorrhage edge by evaluating continuity of the feature quantity from the peripheral area to the hemorrhage edge.

17. The image processing apparatus according to claim 1, wherein
the hemorrhage edge determination section determines whether or not the candidate area is the hemorrhage edge based on a fluid surface color tone of an internal area of the candidate area for the hemorrhage edge.

18. The image processing apparatus according to claim 1, wherein the mucous membrane shape areas is a groove formed on a surface of the mucous membrane.

\* \* \* \* \*

UNITED STATES PATENT AND TRADEMARK OFFICE
CERTIFICATE OF CORRECTION

| | | |
|---|---|---|
| PATENT NO. | : 8,204,287 B2 | |
| APPLICATION NO. | : 12/859628 | |
| DATED | : June 19, 2012 | |
| INVENTOR(S) | : Ryoko Inoue et al. | |

It is certified that error appears in the above-identified patent and that said Letters Patent is hereby corrected as shown below:

Column 30, line 66 (claim 13, line 22) should read: the feature quantity, the hemorrhage edge determina- Signed and Sealed this
Eleventh Day of September, 2012

David J. Kappos
*Director of the United States Patent and Trademark Office*